US009139457B2

(12) United States Patent
Hatten

(10) Patent No.: US 9,139,457 B2
(45) Date of Patent: Sep. 22, 2015

(54) WASTE WATER TREATMENT SYSTEMS AND METHODS

(75) Inventor: Paul Hatten, Carlsbad, CA (US)

(73) Assignee: ANUE WATER TECHNOLOGIES, INC., Vista, CA (US)

( * ) Notice: Subject to any disclaimer, the term of this patent is extended or adjusted under 35 U.S.C. 154(b) by 830 days.

(21) Appl. No.: 12/888,294

(22) Filed: Sep. 22, 2010

(65) Prior Publication Data

US 2011/0068060 A1    Mar. 24, 2011

Related U.S. Application Data

(60) Provisional application No. 61/244,840, filed on Sep. 22, 2009, provisional application No. 61/360,410, filed on Jun. 30, 2010.

(51) Int. Cl.
*C02F 11/06* (2006.01)
*C02F 1/72* (2006.01)
(Continued)

(52) U.S. Cl.
CPC ............. *C02F 1/78* (2013.01); *B01F 3/0865* (2013.01); *B01F 5/106* (2013.01); *B01F 5/22* (2013.01);
(Continued)

(58) Field of Classification Search
CPC ...... C02F 1/76; C02F 1/008; C02F 2201/784; C02F 2307/08; C02F 3/24; C02F 1/686; B01F 3/04099; B01F 3/0876; B08B 9/0936; E03F 5/105; E03F 5/18
USPC ......... 210/627, 628, 629, 744, 752, 760, 765, 210/98, 170.04, 170.06, 170.08
See application file for complete search history.

(56) References Cited

U.S. PATENT DOCUMENTS 4,064,047 A    12/1977    Bernreiter et al.
5,038,810 A    8/1991    Pacheco et al.
(Continued)

FOREIGN PATENT DOCUMENTS

AU    39856/93    12/1994
WO    WO 97/47933 A1    12/1997
(Continued)

OTHER PUBLICATIONS

PCT/US2010/040683 PCT International Search Report, PCT/ISA/210, Feb. 10, 2011, pp. 1-3.
(Continued)

*Primary Examiner* — Nam Nguyen
*Assistant Examiner* — Claire Norris
(74) *Attorney, Agent, or Firm* — Loza & Loza LLP; Anthony G. Smyth

(57) ABSTRACT

Systems, apparatus and methods are described that control and manage wastewater collection and treatment. One or more sensors monitor and measure levels of contaminants, other chemicals and or environmental conditions in a well of a collection station and/or in inflow and/or outflow mains. An additive that can include one or more of ozone, oxygen, a bioagent, bleach, peroxide and other chemicals, and selected to treat chemicals and/or contaminants in wastewater, can be mixed with waste water in the well and the main. A dispersion assembly deployed within the collection station is adapted to mix and spray the waste water and additive onto a wall of the well or surface of a body of wastewater in the well. A processor configured to control the rate at which the additive is provided to the dispersion assembly or force main based on measurements of contaminants received from the first and second sensors.

20 Claims, 13 Drawing Sheets

(51) Int. Cl.
*C02F 1/78* (2006.01)
*C02F 1/00* (2006.01)
*B01F 5/10* (2006.01)
*B01F 15/00* (2006.01)
*B01F 3/08* (2006.01)
*B05B 3/06* (2006.01)
*B01F 5/22* (2006.01)
*C02F 1/68* (2006.01)
*C02F 3/34* (2006.01)
*C02F 101/10* (2006.01)
*C02F 101/16* (2006.01)
*C02F 101/32* (2006.01)
*C02F 103/00* (2006.01)
*B05B 1/34* (2006.01)
*B05B 13/06* (2006.01)
*B05B 15/02* (2006.01)
*B01F 3/00* (2006.01)

(52) U.S. Cl.
CPC ....... B01F 15/00032 (2013.01); B01F 15/0035 (2013.01); B01F 15/00155 (2013.01); B05B 3/063 (2013.01); C02F 1/008 (2013.01); *B01F 2003/0028* (2013.01); *B05B 1/34* (2013.01); *B05B 13/0636* (2013.01); *B05B 15/02* (2013.01); *C02F 1/682* (2013.01); *C02F 1/722* (2013.01); *C02F 1/727* (2013.01); *C02F 3/348* (2013.01); *C02F 2101/101* (2013.01); *C02F 2101/16* (2013.01); *C02F 2101/32* (2013.01); *C02F 2101/325* (2013.01); *C02F 2101/40* (2013.01); *C02F 2103/001* (2013.01); *C02F 2201/784* (2013.01); *C02F 2209/001* (2013.01); *C02F 2209/003* (2013.01); *C02F 2209/006* (2013.01); *C02F 2209/008* (2013.01); *C02F 2209/22* (2013.01); *C02F 2209/23* (2013.01); *C02F 2209/26* (2013.01); *C02F 2209/40* (2013.01); *C02F 2209/42* (2013.01); *C02F 2209/44* (2013.01); *C02F 2301/024* (2013.01); *C02F 2301/043* (2013.01); *C02F 2303/02* (2013.01); *C02F 2303/04* (2013.01); *C02F 2303/08* (2013.01); *C02F 2303/14* (2013.01); *C02F 2303/20* (2013.01); *C02F 2305/04* (2013.01); *C02F 2307/08* (2013.01)

(56) References Cited

U.S. PATENT DOCUMENTS

| | | | |
|---|---|---|---|
| 5,147,530 | A | 9/1992 | Chandler et al. |
| 5,350,543 | A | 9/1994 | Spradley |
| 6,068,778 | A * | 5/2000 | Steiner et al. .................. 210/760 |
| 6,132,678 | A * | 10/2000 | Heller et al. ...................... 422/4 |
| 6,284,138 | B1 * | 9/2001 | Mast ............................ 210/606 |
| 6,868,857 | B2 * | 3/2005 | McCasker .................. 134/56 R |
| 7,082,952 | B1 | 8/2006 | McCasker et al. |
| 7,553,447 | B2 * | 6/2009 | Decker et al. ................... 422/28 |
| 2003/0072213 | A1 | 4/2003 | Cocoli |
| 2003/0209502 | A1 * | 11/2003 | Lacasse et al. ................ 210/760 |
| 2004/0154998 | A1 * | 8/2004 | Minnix ......................... 210/760 |
| 2007/0267334 | A1 * | 11/2007 | Osborn et al. .................. 210/97 |
| 2012/0267318 | A1 * | 10/2012 | Hatten ........................... 210/744 |

FOREIGN PATENT DOCUMENTS

| | | |
|---|---|---|
| WO | WO 01/58605 | 8/2001 |
| WO | WO 2005-035447 A2 | 4/2005 |
| WO | WO 2008/014559 | 2/2008 |

OTHER PUBLICATIONS

PCT/US2010/049881; PCT International Search Report, PCT/ISA/210, Jun. 27, 2011, pp. 1-3.

* cited by examiner

Section A-A

EP-300 SERIES SYSTEM REQUIREMENTS AND SPECIFICATIONS

| System Overview | | EP-315 | EP-315-Pxxx (See Pump Systems, below) | EP-320 | EP-320-Pxxx (See Pump Systems, below) |
|---|---|---|---|---|---|
| Single Output System, Patent Pending | | 1.5" (38 mm) | 1.5" (38 mm) | 2.0" (51 mm) | 2.0" (51 mm) |
| Head Assembly, Composite Head, Sealed Rotary Bearing Assembly, 316 Stainless Steel | | EP-HA315 | EP-HA315 | EP-HA320 | EP-HA320 |
| Mounting Bracket, Dual Camlock, Safety Rod, 316 Stainless Steel | | EP-MB1315 | EP-MB1315 (2) | EP-MB1320 | EP-MB1320 (2) |
| Feed Mast, NPT thread, Lifting Handle, 1" Liquid Injection Port/Bolt | | EP-FM1315 | EP-FM1315 (2) | EP-FM1320 | EP-FM1320 (2) |
| Pump, Centrifugal Grinder, 2 or 5 hp (see below) | | None | 1 | None | 1 |
| Control Panel & Timer (see below) | | None | 1 | None | 1 |
| Wastewater Application | | Single discharge main tap | Self-contained system with pump and control | Single or dual discharge main tap | Self-contained system with pump and control |
| System Operating Requirements | | EP-315 | EP-315-Pxxx (See Pump Systems, below) | EP-320 | EP-320-Pxxx (See Pump Systems, below) |
| Flow: gallons / minute at ≥4 psi, 25 rpm | 1 gpm = 3.8 lpm | 52 gpm | 52 gpm | 76 gpm | 76 gpm |
| Flow: gallons / minute at ≥4 psi, 18 rpm | 1 gpm = 3.8 lpm | 51 gpm | 51 gpm | 74 gpm | 74 gpm |
| Rotational Speed Range | | 18 to 25 rpm | 18 to 25 rpm | 18 to 25 rpm | 18 to 25 rpm |
| Pump Horsepower | *Pump part of system | ≥5 hp | 2 hp* | ≥10 hp | 5 hp* |
| Pump Run Time Minimum per Day | | ≥5% | ≥5% | ≥5% | ≥5% |
| Discharge Main Diameter | 1 inches = 25.4 mm | ≥4 inches | Not Applicable | ≥8 inches | Not Applicable |
| Optimum / Minimum Position above High Float | 1 foot = 0.31M | 4 feet / 1 foot | 4 feet / 1 foot | 4 feet / 1 foot | 4 feet / 1 foot |
| Wet Well Minimum Diameter Required | (feet) | ≥4 feet | ≥4 feet | ≥4 feet | ≥4 feet |
| Specifications Pump Systems | | EP-315-P221 | EP-315-P223 | EP-320-P521 | EP-320-P523 |
| Pump, Control-Timer Part Number | | AGP-221 | ACP-223 | ACP-521 | ACP-523 |
| Centrifugal Grinder Pump- Horsepower | | 2 hp | 2 hp | 5 hp | 5 hp |
| Input Voltage, Phase | | 208-220 VAC, 1∅ | 230 VAC, 3∅ | 208-230 VAC, 1∅ | 230 VAC, 3∅ |

Figure 9

WASTE WATER TREATMENT SYSTEMS AND METHODS

CROSS-REFERENCE TO RELATED APPLICATIONS

The present application claims priority from U.S. Provisional Patent Application No. 61/244,840 that was filed Sep. 22, 2009 and from U.S. Provisional Patent Application No. 61/360,410 that was filed Jun. 30, 2010, which applications are hereby incorporated by reference herein for all purposes. The present Application is related to U.S. patent application Ser. No. 12/756,938 filed Apr. 8, 2010 and U.S. patent application Ser. No. 12/828,182 filed Jun. 30, 2010, which applications are expressly incorporated are hereby incorporated by reference herein.

BACKGROUND OF THE INVENTION

1. Field of the Invention

The present invention relates generally to well cleaning systems and more particularly to in-well cleaning apparatus.

2. Description of Related Art

Sewage systems are in wide spread use for the removal of liquid waste from houses, factories and agricultural sites. The sewage flows through pipes into intermediate wells and finally into treatment plants or waste dumps. Electric pumps are usually used to maintain the flow and keep the wells below maximum capacity. These pumps are configured to operate when the level in the wells reaches a preset limit indicating that the flow needs pumping.

When the well level falls to a minimum level the pump is switched off and this level may be maintained for some time leaving a biofilm residue on the walls of the well between the maximum and minimum levels. This residue tends to harden and build up thus reducing the capacity of the well, and increasing the frequency of the pump operation.

Wastewater collection and treatment systems are a source of bad odors, the most prevalent coming from Hydrogen Sulphide, a toxic and corrosive gas with a characteristic rotten-egg smell. This is a bacterially mediated process that occurs in the submerged portion of sanitary sewerage systems. It begins with the establishment of a slime layer below the water level, composed of bacteria and other inert solids held together by a biologically secreted protein "glue" or biofilm called zooglea. When this biofilm becomes thick enough to prevent the diffusion of dissolved oxygen, an anoxic zone develops under the surface.

Hydrogen Sulfide is also a precursor to the formation of Sulfuric Acid, which causes the destruction of metal and concrete substrates and appurtenances within wastewater facilities and collection stations. The effect of biogenic sulfide corrosion and the formation of a 7% Sulfuric Acid solution on concrete surfaces exposed to the sewer environment are devastating. Entire pump stations and manholes and large sections of collection interceptors have collapsed due to the loss of structural integrity in the concrete. Accordingly the residue must be cleaned off the well walls and removed from the surface of the sewer water periodically to maintain the system in good working order as well as protecting concrete structures against the biogenic sulfide corrosion in wastewater collection and treatment systems so as to met the structure's anticipated design life as well as protecting the surrounding ground level infrastructure and environment.

BRIEF SUMMARY OF THE INVENTION

Certain embodiments of the present invention provide systems and methods for controlling and managing waste water treatment. One or more sensors are provided within a waste water collection station to monitor and measure levels of contaminants, other chemicals and or environmental conditions in a well of a collection station. One or more sensors may be provided in inflow and/or outflow mains to monitor levels of contaminants, other chemicals and or environmental conditions in the mains. The mains may comprise force mains and/or gravity mains. A pump associated with the collection station to evacuate waste water from the well throw an outflow main, typically when the volume of waste water in the well has exceeded a predetermined threshold volume.

Certain embodiments comprise an ozone generator configured to generate ozone for treatment of waste water. Certain embodiments comprise a supply of an additive that can include one or more of ozone, oxygen, a bioagent, bleach, peroxide and other chemicals selected to treat chemicals and/or contaminants in waste water. In some embodiments, the ozone is maintained in a reservoir of ozone. A dispersion assembly deployed within the collection station is adapted to mix a portion of the waste water from the well with ozone and/or additive. The dispersion assembly can be configured to spray a wall of the well and/or a surface of the volume of waste water in the well with a mixture of the ozone and the waste water.

Certain embodiments comprise a force main treatment system operable to mix a portion of the waste water from an outflow main with ozone and/or the additive and configured to reintroduce the mixed ozone and waste water from the outflow main into the outflow main.

Certain embodiments comprise a processor that can be configured to control the rate at which ozone is provided to the dispersion assembly and/or to the force main treatment system based on measurements of contaminants received from the first and second sensors. The processor may be configured to maintain the level of contaminants in the well and the outflow main below desired threshold level.

BRIEF DESCRIPTION OF THE DRAWINGS

FIG. 9 is a table of specifications associated with certain embodiments of the invention.

DETAILED DESCRIPTION OF THE INVENTION

Figure 1:
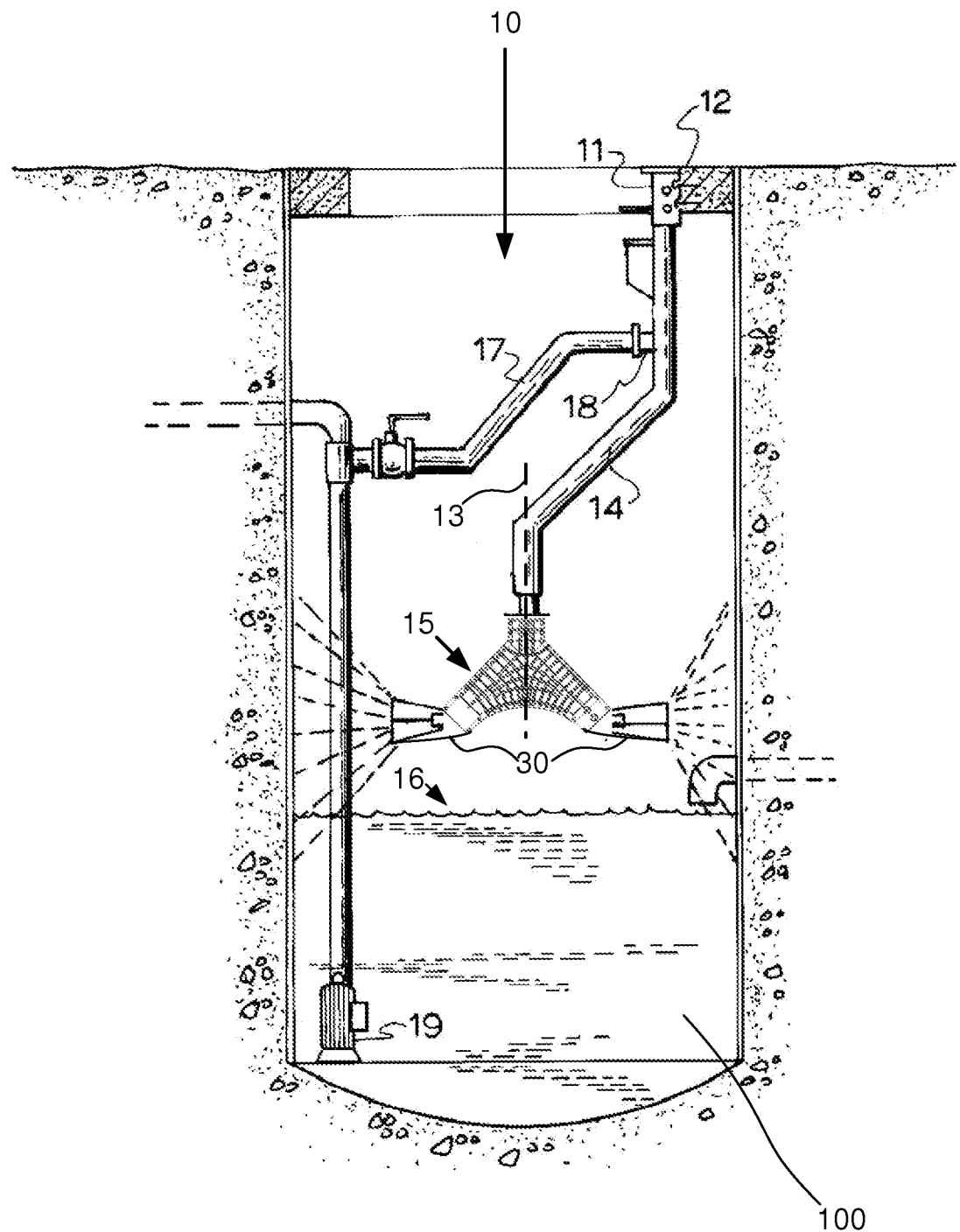
FIG. 1 is an elevation depicting an example of the presently claimed apparatus deployed within a well.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments comprise systems and apparatus that resolve environmental problems in municipal, industrial and other applications including $H_2S$ & VOC odor, iron bacteria, grease (FOG) accumulation and so on. For example, certain embodiments can be used to oxidize undesirable chemicals such as sulfides, ammonia and organic solvents, and can kill bio-film growth. Certain embodiments of the invention provide methods for controlling the operation of well cleaning apparatus. In particular, computing systems may be deployed to monitor the environment within wells, forced mains, sewers and other infrastructure used to handle and treat waste water, well water, sewage, storm water, contaminated water, grey water, oil well brines, and other fluids. The fluids may include solid matter. There follows a description of certain waste water treatment systems that serve as an example of systems in which the presently disclosed control system can be deployed.

Certain embodiments of the present invention can be deployed to control well cleaning apparatus in order to improve the efficiency and effectiveness of such equipment. For the purposes of this description, an example of well cleaning apparatus will be used that bears certain similarities to apparatus described in the application filed under the patent cooperation treaty and numbered PCT/AU2007/001083 (and incorporated by reference herein in its entirety). Certain embodiments of the present invention can be retrofitted to conventional well cleaning apparatus and it will be appreciated that certain components of well cleaning equipment may be redesigned, adapted and/or reconfigured to maximize the advantages accrued from the present invention. In some embodiments, for example, pump operating characteristics may be loosened because spray assemblies according to certain aspects of the invention can disperse accretions of solids deposited during variations in pump output.

As depicted in FIG. 1, a well cleaning apparatus according to certain aspects of the invention can be mounted on, or suspended from a frame or bracket 11 such that it extends into and is configurable to clean interior of well 10 and to treat a body of liquid 100 contained within well 10. The well-cleaning apparatus may be attached by fasteners 12 at the top of a well 10. It is contemplated that certain embodiments may provide a well-cleaning apparatus within a tank, a drum, a vault or other vessel, conduit or container. For the purpose of description, the terms well, tank, drum, vault, sump or other container will be used henceforth interchangeably as "well 10." In the example of FIG. 1, a fluid is transmitted through pipe or hose 17 to a conduit 14 and, from there, to spray assembly 15 which directs jets of fluid using deflectors 30 of spray assembly 15. In certain embodiments, spray assembly 15 is rotatably mounted to conduit 14 such that spray assembly 15 may rotate around axis of rotation 13 in order to obtain rotating water jets. Rotation is typically driven by force of water pressure. In operation, jets may provide a spray to the walls of the well 10, the surface of liquids 100 in the well 10 or tank and other equipment located within the well 10. The hose or pipe 17 is typically coupled to the conduit at coupling 18 and the fluid provided for cleaning can be obtained from an external source of water or derived from effluent pumped from the well by a submersible or other pump 19. It will be appreciated that, in conventional systems, pump 19, conduit 14, coupling 18 and jets may be subject to clogging, even where the system and its components are designed to pass anticipated solids such as, for example, solids up to 50 mm in diameter and 90 mm long found in a sewage stream.

Figure 2:
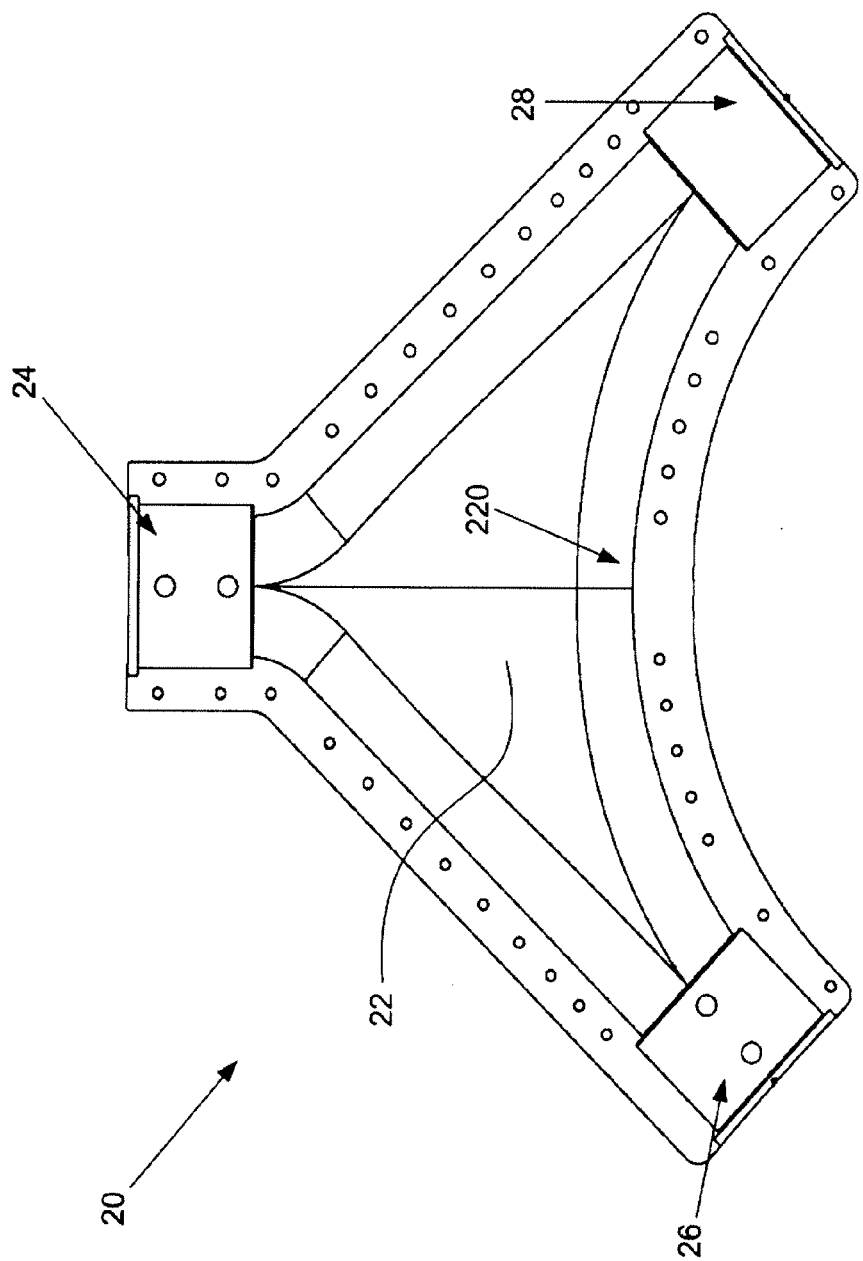
FIG. 2 shows a cross-sectional view of a mixer according to certain aspects of the invention.
Figure 3:
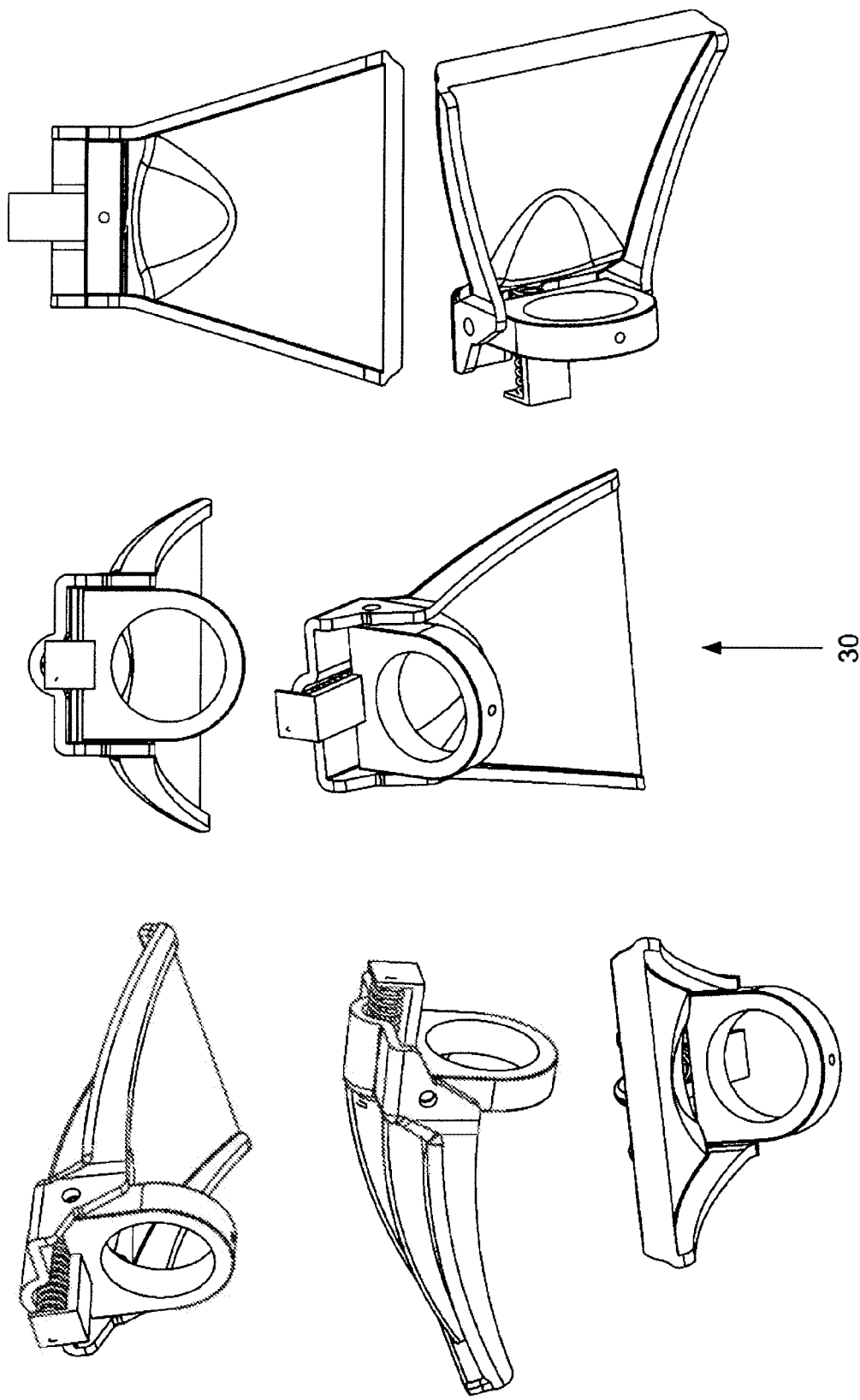
FIG. 3 shows variously angled views of a deflector vane according to certain aspects of the invention.

Certain embodiments of the present invention provide a spray assembly 15 for use in an automatic well washer that can reduce and/or eliminate the occurrence of blockage from accumulation of solid matter in a fluid stream used to wash the well, vault or tank. Referring to FIGS. 2 and 3, a spray assembly according to certain aspects of the invention typically comprises a mixer 20 and one or more deflectors 30 that cooperate to direct a flow of fluid to spray the walls of the well 10, the surface 16 of the liquid 100 in the well 10 and other equipment located within the well 10. Mixer 20 is configured to optimize, control and generate flows and currents that prevent buildup of solid materials in an interior chamber 22 of mixer 20 and on the deflectors 30. Deflectors 30 are typically used to direct the flow of fluid to a target area for cleaning and may be angled or tilted in a manner that causes the spray head to rotate. The deflectors may have preset tension mechanisms fitted that allow the deflectors to automatically maintain the required RPM at any given pressure and or flow, from the mixing chamber outlets, needed for the successful rotation speed of the hydrodynamic mixing chamber so it does not interfere with any fitted level sensors that are existing within the wet well area. These sensors could include ultra sonic, electric float, pressure switch type mechanisms.

In conventional systems, eddy currents may create areas of low pressure within a spray head and variations in pressure may be observed during a pumping cycle, or when a flow fluid or liquid through the system and/or when a pump ceases operation. In response to such variations, conventional equipment may become progressively clogged as solids settle at junctions or distributors (e.g. in a tee piece), in small diameter pipe lines, fittings, bends, elbows, valves and areas of low pressure. Clogging can lead to partial or complete obstruction of the system. However, a mixing chamber constructed according to certain aspects of the invention avoids the potential for obstruction.

Certain embodiments provide a spray assembly 15 that includes mixer 20 having specifically engineered curves calculated to provide clog free operation of washer head using un-filtered stream of sewer water, storm water, sewage, contaminated water and grey water or the like. The example of FIG. 2 shows one embodiment where dimensions are typical for use in many sewage applications. Radii of curvature, cross-sectional diameters and other dimensions are selected based on parameters attributable to the application, including range of viscosity of the fluid, maximum and minimum size of solids, pressure developed by pump 19 and operating temperatures. Fluid flowing into chamber 22 from inlet 24 is directed to outlets 26 and 28. An impact surface 220 defined generally opposite the inlet is constructed to minimize undesired reflections and resultant waves, eddies and vortices in the fluid. Thus, the fluid flows through chamber 22 relatively smoothly. In some embodiments, the fluid can be caused to swirl, rotate or be otherwise agitated as desired.

In particular, the structure, location and dimensions of certain curved sections are calculated to enable free flow of un-filtered liquids. Fluid entering a first orifice 24, which serves as an inlet, passes to interior chamber 22 where the flow splits and exits the interior chamber 22 through other orifices 26 and 28 that serve as outlets to vent the liquid. The shape and dimensions of interior chamber 22 are selected to cause deposits of solids and bio-solids to be rolled and circulated into the liquid passing through the interior chamber 22. Solids and bio-solids are then pushed by the liquid flow liquid out of outlets 26 and 28.

In certain embodiments, mixer 20 can cause liquid to flow around solids and otherwise apply pressure to solids which have previously settled within interior chamber 22, including settlements occurring due to end of a pump cycle or during periods of low fluid flow. The structure of interior chamber 22 can create an agitation that causes accumulated solids and/or bio-solids to be lifted and circulated and eventually carried through outlets 26 and 28.

FIG. 3 depicts various views of a deflector 30 that can be used in conjunction with spray assembly 15. One or more deflectors 30 can be attached to mixer 20. In certain embodiments, deflector 30 is designed to respond to hydrodynamic forces created by the liquid as it is expelled through outlets 26 and 28. As the fluid passes over surfaces of the deflector 30, it may exert direct pressure on the surfaces of deflector 30 and/or generate aerodynamic or hydrodynamic pressure differences that cause the desired rotation. Thus, the volume and pressure of the liquid forced out of the mixer 20 can be used to cause and control rotation of the spray assembly. Rotation typically occurs when deflector 30 is suitably angled with respect to the outflow from outlets 26 and 28 and with respect to an axis of rotation 13 of the spray assembly. Thus, deflector 30 may have a "park" angle at which deflector 30 causes no rotational motion.

In certain embodiments, speed of rotation can be controlled by configuration and position of deflectors 30. A desired speed of rotation can be selected in this manner. Typically the angle of deflector 30 relative to an axis of rotation 13 of the spray assembly is selected to control speed of rotation. Speed of rotation may be automatically controlled to limit rotation to the desired speed of rotation by varying the angle and position of deflectors based on current speed of rotation. In particular, angle and/or position of deflectors 30 may be automatically adjusted in response to changes in pressure and volume of liquid passing through the outlets 26 and 28 of mixer 20. Consequently, the disclosed system may accommodate a broad range of pumps 19 and modes of operation of those pumps 19. For example, the system may accommodate a pump 19 driven at different rates selected to obtain different throughputs.

In certain embodiments, a pre-tensioned spring system can be used to control angle and or position of deflectors 30 based on actual speed of rotation. Such control can reduce liquid dispersal to a "ribbon action" and can prevent aerosol action and/or misting that can cause release of $H_2S$ and other undesired gas components. In some embodiments, speed of rotation may be automatically controlled using aerodynamic or hydrodynamic elements attached to the deflector and/or mixer 20, whereby the additional elements generate a force resistant to rotation proportional to the speed of rotation of spray assembly 15.

In certain embodiments, spray assembly 15 may be free to translate along the axis of rotation under the force of the outflow from outlets 26 and 28. Additional mechanisms may adjust the angle and direction of the deflector 30 after translation a predetermined distance, causing a reversal in direction and resulting in an oscillation of the spray assembly 15 that increases the area treated by the system. In certain embodiments the form, size and angle of the deflectors 30 can be used to control surface area of spray coverage.

The spray assembly 15 may be operated in applications where full-size solids are required to pass through freely without obstruction and clogging at various volumes and pressures. Full-size solids include solids that can pass through an inlet orifice having a predetermined diameter.

Figure 4:
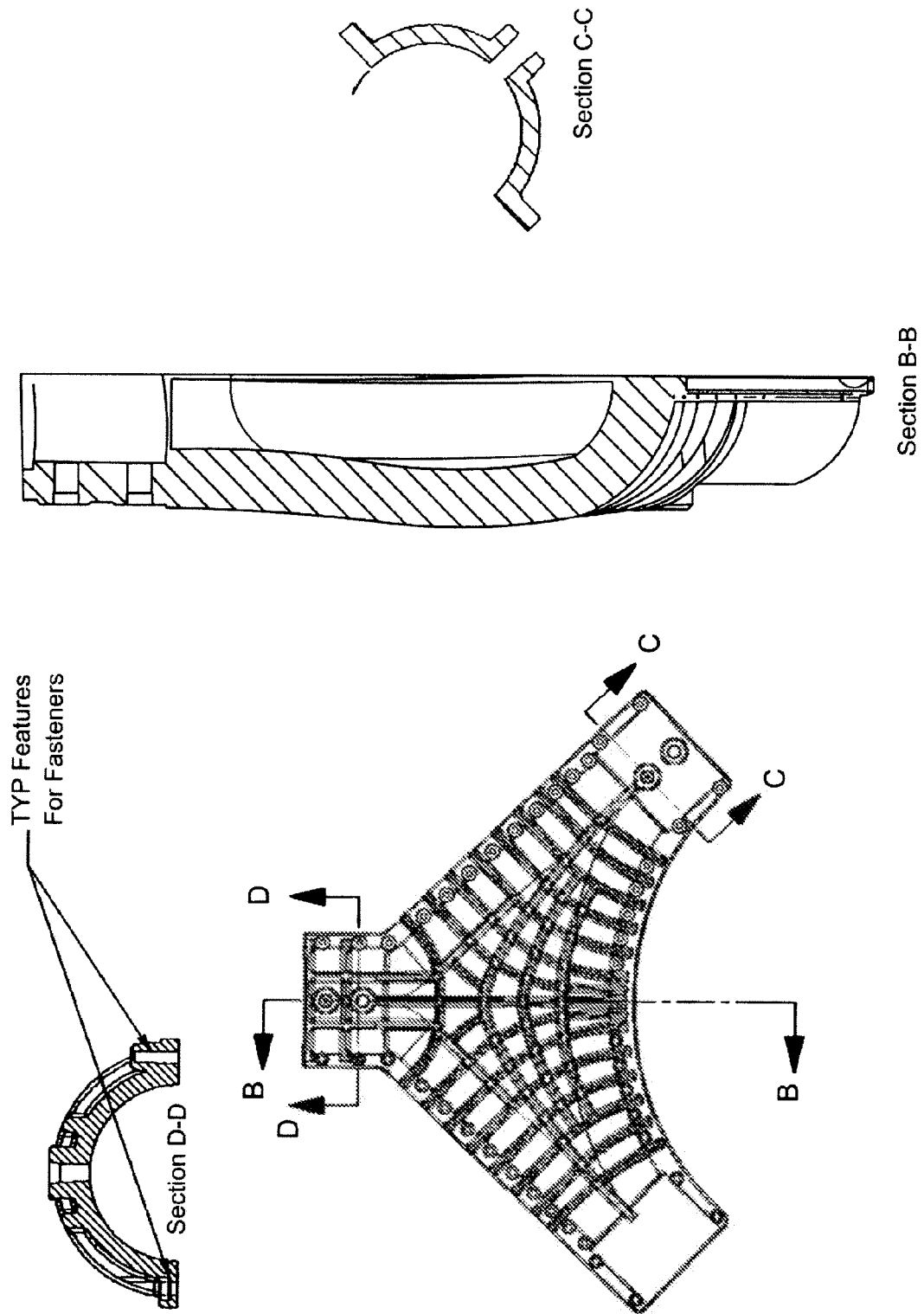
FIG. 4 is a detailed view of a mixer.
Figure 5:
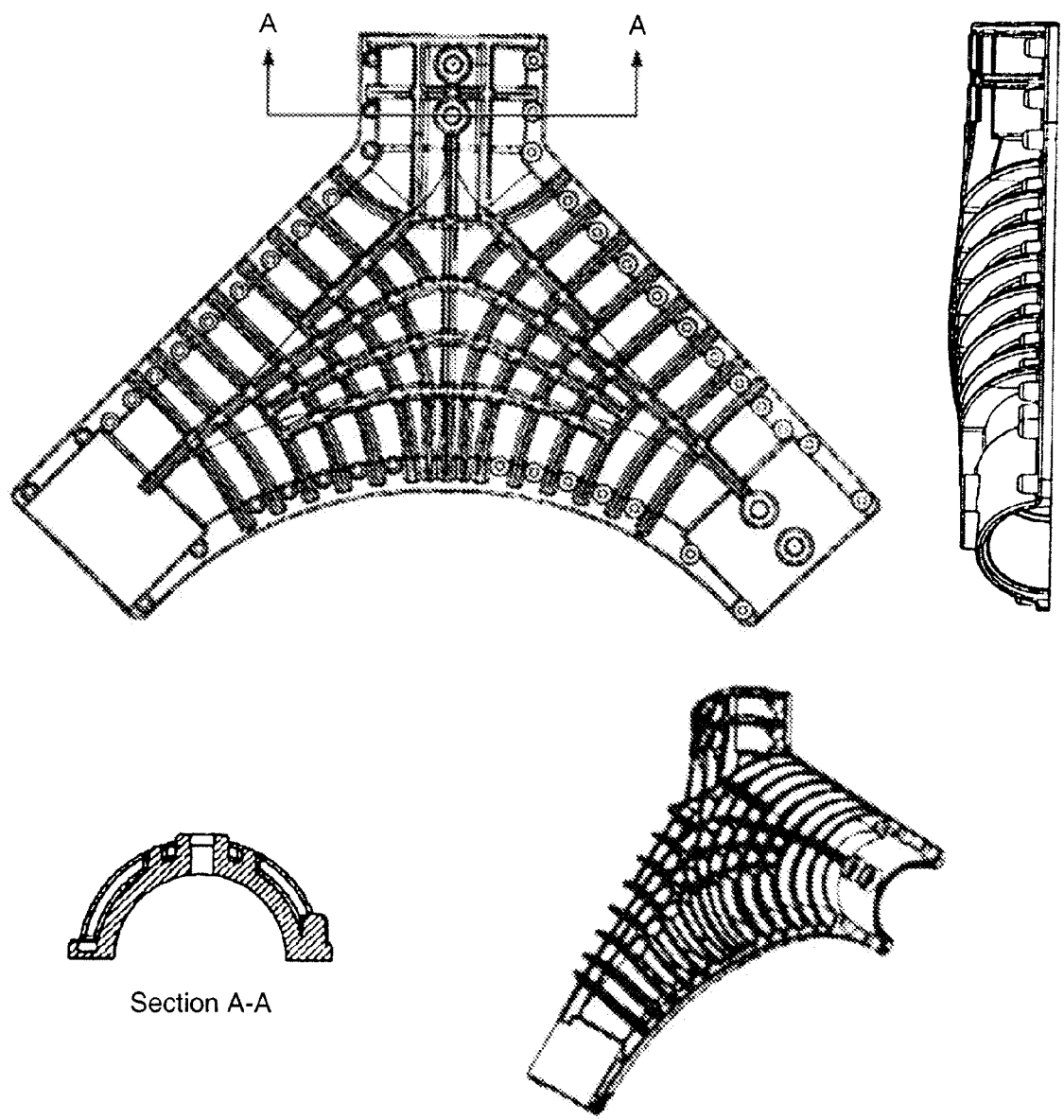
FIG. 5 is a detailed view of a mixer.

In certain embodiments, liquids containing solids and/or bio-solids passing through mixer 20 are typically agitated, oxygenated and homogenized. Moreover, a surface of a liquid contained by the well may be agitated, oxygenated and homogenized by the action of spray assembly 15. In addition to agitation, oxygenation and homogenization substances such as fat, oil, grease and bio-film present on the surface of the liquid in the well may be solubilized. In certain embodiments, mixer 20 can be sized to accommodate other outflows without fixing a new mixing chamber by simply attaching flow reducers to outlet orifices. FIGS. 4 and 5 are engineering drawings showing detailed design information associated with one example of a spray assembly 15 according to certain aspects of the invention.

Pumping Station

Certain embodiments of the invention can be adapted for fitting into pumping stations, which are also known as "lift stations." Pumping stations in sewage and storm water collection systems are typically adapted to handle gravity-fed raw waste water received from pipelines. Sewage can be stored in a wet well that includes a pump that drives (lifts) the sewage upward through a sewer force main. According to certain aspects of the invention, spray assembly 62 (FIG. 6) can be installed in pumping stations to obtain mechanical wastewater conditioning and cleaning that can keep lift stations free of organic and biological build-up. Lift station wastewater conditioning typically occurs through an ongoing process of surface agitation that prevents biofilm build-up. Additionally oxygenation and homogenization can promote aerobic activity with the effluent flow quality becoming consistent and predictable. A fractional amount of discharged flow can be recycled back into the well, resulting in a self-sustaining, "green" solution that enhances aerobic activity and automates well structure cleaning.

Figure 7:
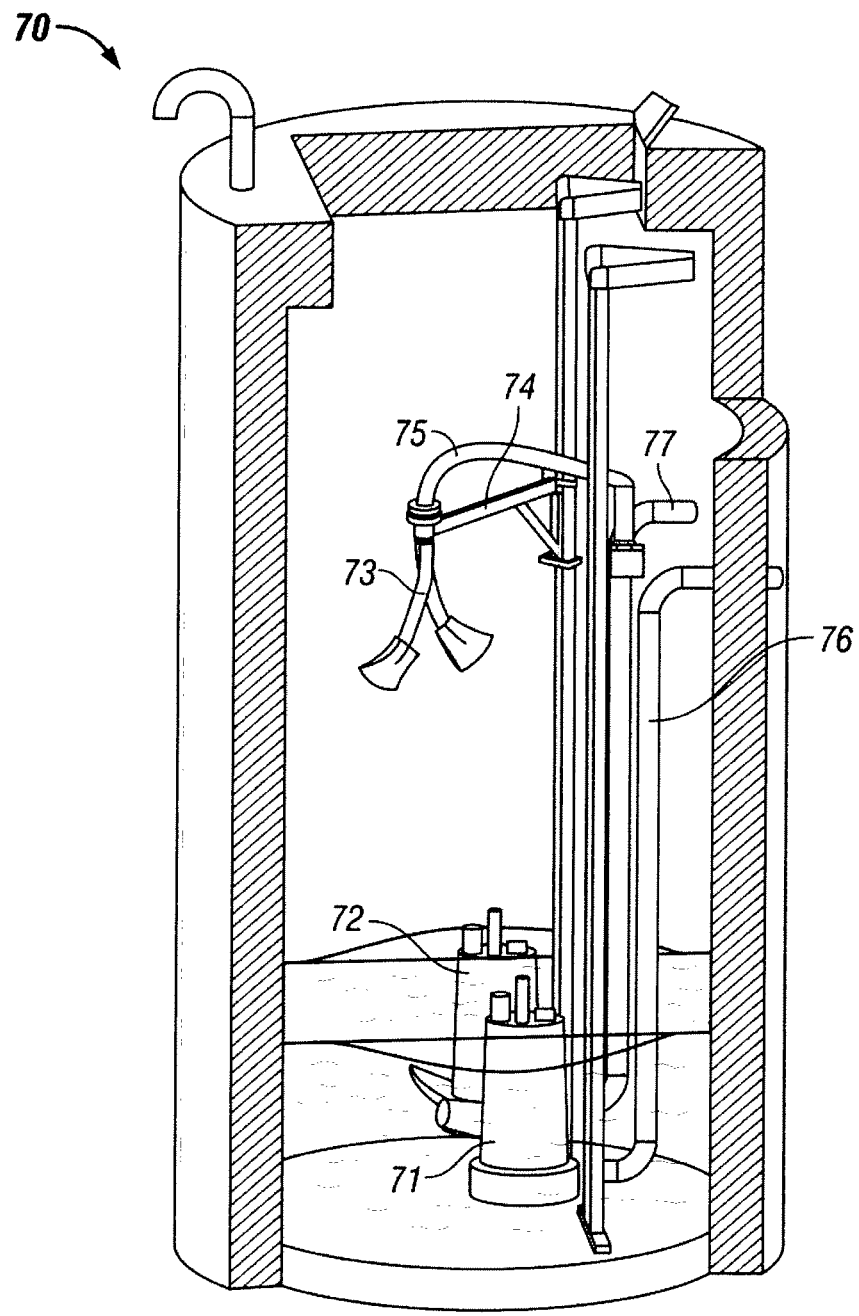
FIG. 7 shows a well having deployed therein, a spray assembly according to certain aspects of the invention.
Figure 8:
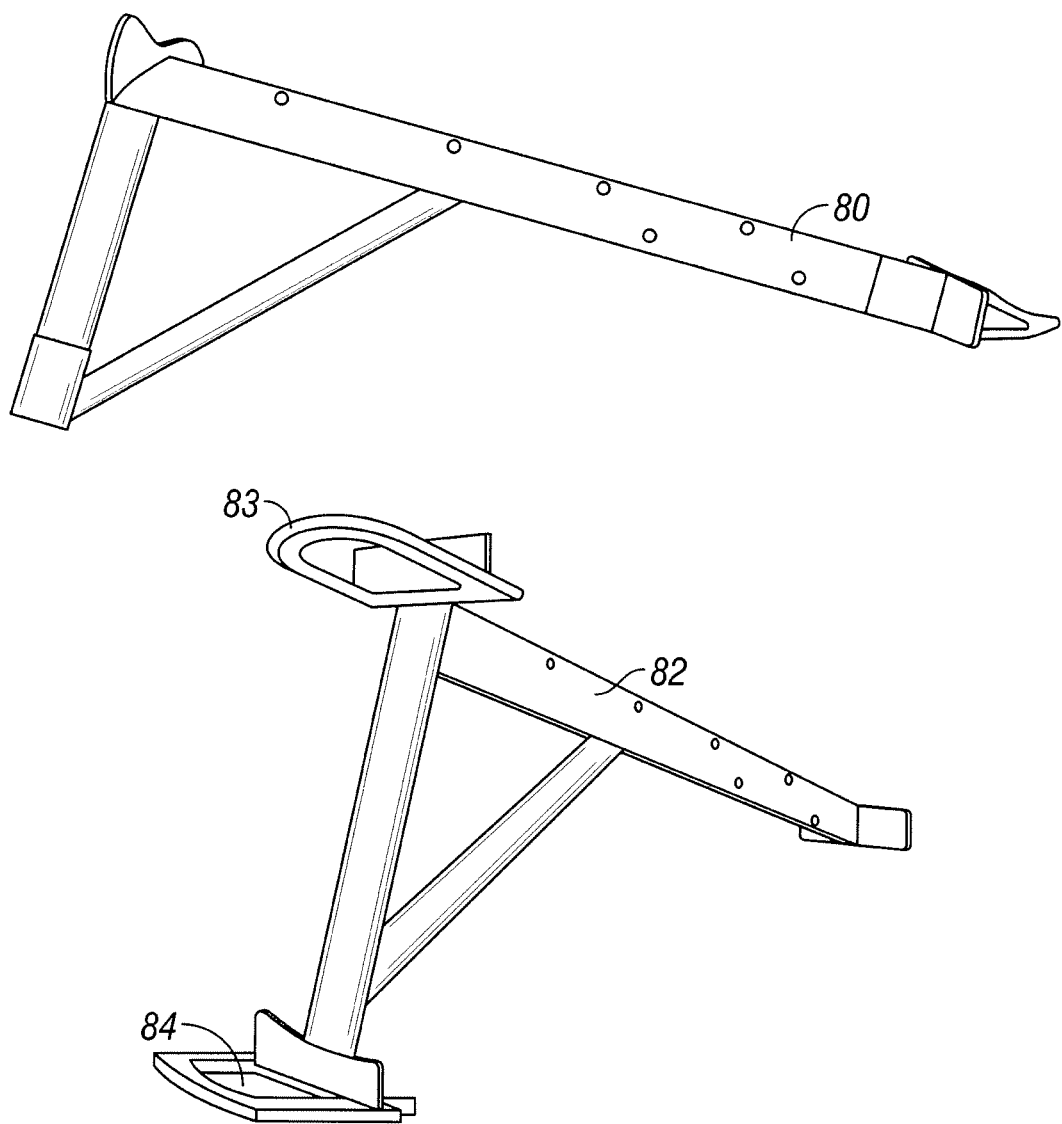
FIG. 8 depicts mounting brackets used for mounting a spray assembly according to certain aspects of the invention.

FIG. 7 shows an example of a lift station 70 in which a spray assembly 73 is fitted using bracket 74. Bracket 74 is used in this example to mount the spray head assembly to a pipe. FIG. 8 shows two examples of brackets that can be used: bracket 80 is typically used to mount spray assembly to a wall and bracket 82 has loop fasteners 83 and 84 for attachment to a pipe, as shown in FIG. 7. Spray head 73 can deliver a spray, typically a ribbon spray, which breaks up and prevents build-up of organic and bio-organic matter that can include fat, oil, grease and biofilm on surface of well fluid 72. Fluid is pumped from the well using pumps 71 and 72 and a portion of the pumped fluid is typically extracted from a tap in a pipe 76 or 77 pressurized by the pump; this portion is directed to the spray head assembly 73 for mixing and spraying. As described above, spray head assembly 73 typically includes a hydrodynamic mass transfer mixing chamber that oxygenates fluids, thereby increasing oxygen levels in the well. In one example, wastewater mixed in spray assembly 73 has increased dissolved oxygen content that has been measured at 800% or more of the dissolved oxygen observed in conventional systems. Because a portion of the waste water is recycled, solids can be homogenized by agitation through the nozzle and by spraying. Solids having a smaller volume have increased surface area that, together with the increased dissolved oxygen content, promotes significant increases in aerobic activity.

In certain embodiments, the use of the described spray assembly 73 (and see FIG. 6) automates cleaning of the pumping station and reduces maintenance overhead by reducing or eliminating fat, oil, grease and biofilm accumulation. The spray head 73 may be rotated under the force of wastewater flowing through the pumping station or may remain static. Accordingly, the cleaning mechanism can be powered by the pump already available within the pumping station. By recycling a fraction of discharge flow, wastewater can be reconditioned as the lift station is cleaned without the need for an additional external power supply. Moreover, clean water is not needed for regular wash down, improving the well conformance to environmental requirements.

Figure 10:
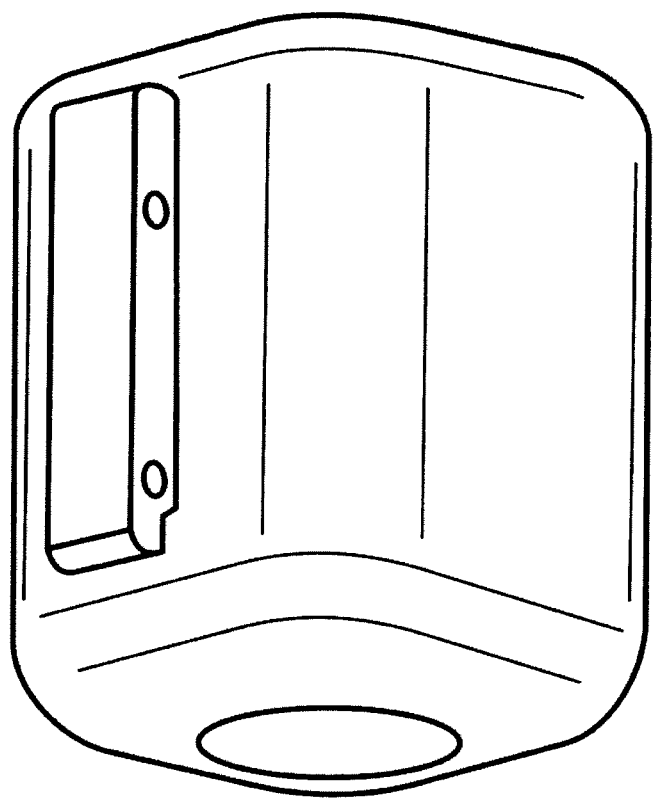
FIG. 10 shows a spray head according to certain aspects of the invention.

In certain embodiments, the rotary head assembly 73 may be selected from a plurality of different assembly types. The number of nozzles used on the head assembly 73 may vary. In some embodiments, the number of nozzles may be selected to provide maximum coverage when a spray head assembly is fixed and does not rotate, but produces a fixed spray pattern (see FIG. 10). For example, a stationary spray head assembly may be deployed in small diameter wells. However, some variants of the spray head assembly 73 maybe differentiated by a diameter of the intake pipe which may be selected based on the intended application. In one example, a large diameter head assembly may be selected to handle wastewater having relatively large solids. Large diameter head assemblies having diameters of 1.5" (38 mm) and 2" (51 mm) are typically used in many common lift stations. Larger diameter head assemblies may be used to handle larger wastewater flows. Smaller diameter head assemblies may be used where solid content in fluids provided to the head assembly is minimized in size using a grinding pump or by providing filtered water. In one example, a 1" (25 mm) head assembly may be used with a grinding pump. In another example, a 0.75" (19 mm) head assembly may be used with a relatively clean and/or filtered supply. An example of operational characteristics and specifications for various head assemblies provided according to certain aspects of the invention is shown in FIG. 9.

Embodiments of the invention may be used in a variety of water applications, in lift stations, storm water vaults, and/or clarifiers. The rotary head assembly can be fitted with inserts that modify the flow rate. For example, a ¼" or 1" insert can lower flow requirements while providing superior oxygenation, surface agitation, and wash down action. Spray assembly may be mounted on the side of a well or hung from a top edge of the well and can be fed using piping or hoses from a pipe that is driven by the pump. In certain embodiments, the spray assembly can be mounted to one or more pipes including, for example, a pipe that carries fluid driven by a pump, from which pipe the spray assembly 62 (FIG. 6) is fed. It will be appreciated that the pump typically operates when accumulation of waste or other well content increases above a "high-water" threshold and ceases operation when the content falls below a "low-water" threshold. Accordingly, the system can operate intermittently or continuously according to the rate of flow into the well.

Grinder Station

Certain embodiments of the invention can be adapted for fitting into grinder pump stations. Grinder stations can grind solids in wastewater to form a slurry. It will be appreciated that grinder pumps can reduce clogging in the system and also aid in the delivery of a more specific solids size for successful chemical and or gas into liquid infusion. Accordingly, an alternative nozzle can be used in a spray assembly that is configured to handle smaller solids. A nozzle, such as hydro spear nozzle shown in FIG. 10, can comprise a mixing chamber and delivery system that delivers a ribboned stream of recycled wastewater. Mixing chamber may comprise a reduced size chamber that can promote agitation in order to oxygenate recycled wastewater and to introduce additional turbulence that mitigates obstruction. The resultant spray agitates the surface of the well wastewater, thereby breaking up accumulated fat, oil, grease and biofilm. Increased oxygenation and further homogenization are promoted that breaks down solids further and mixes homogenized matter with air, bacteria and creates an even dispersal of the matter.

The spray nozzle assembly 73 in a smaller well or in a grinder station may be mounted on the side of a well or hung from a lid or top edge of the well but is typically mounted on a discharge pipe used to feed the spray assembly. The spray assembly is typically fed by tap on a pipe 76 and 77 that communicates fluids driven by a grinder pump (e.g. pump 71 or 72). The spray assembly 73 can operate automatically to clean the well based on the cyclic activity of the grinder pump 71 or 72. The pump typically turns on when accumulation of waste or other well content increases above a "high-water" threshold and turns off when the content falls below a "low-water" threshold. Accordingly, the system can operate intermittently or continuously according to the rate of flow into the well.

Materials Injection

In certain embodiments, a spray assembly may be configured or adapted to deliver chemicals and other additives to the interior of the well, including, for example, one or more of a detergent, an oxidizer (such as $O_2$ or $O_3$), bleach, calcium nitrate, ferric chloride, magnesium hydroxide, peroxide, milk of magnesia and/or other chemical selected to target and breakdown a material or group of materials. These additives may be introduced to the well to oxidize compounds that can cause odor and corrosion within water treatment systems. Inorganic gases produced from domestic wastewater decomposition commonly include malodorous gases such as hydrogen sulfide and ammonia and odor producing substances including organic vapors such as indoles, skatoles, mercaptans and nitrogen-bearing organics. It will be appreciated that hydrogen sulfide may react with lime in concrete walls of wells and such reaction can cause structural damage. Hydrogen sulfide may also produce sulfuric acid that can attach and corrode metal and other infrastructure of a well. The oxidation process enabled according to certain aspects of the invention can oxidize sulfides in a wet well, including as it enters a force main, thereby eliminating conditions favorable for anaerobic bacteria to produce $H_2S$. The oxidation process enabled according to certain aspects of the invention can provide an oxygen/ozone mix that is a powerful oxidant that inhibits incoming anaerobic bacteria present in the wet well/force main by reducing sulfide levels while increasing DO. Introduction of ozone and oxygen into the force main can augment these effects.

Figure 6:
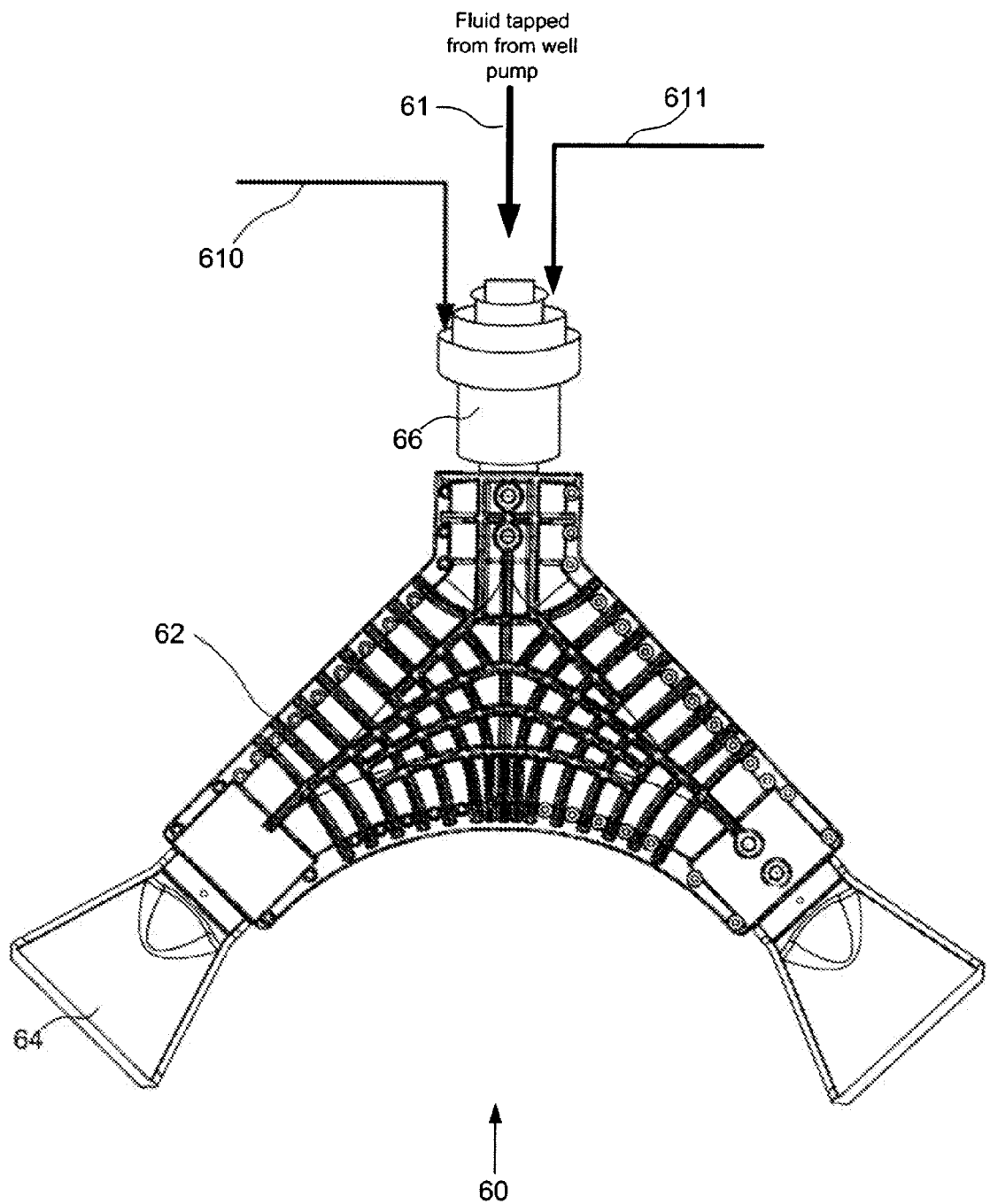
FIG. 6 shows a spray assembly according to certain aspects of the invention.

With reference also to FIG. 6, certain embodiments of the invention provide one or more input ports for feeding one or more chemicals 610, 611 into the mixing chamber of head assemblies. Input ports may direct one or more chemical feeds 610 and 611 to manifold 66 that, in the example of FIG. 6, mixes the one or more chemicals 610 and 611 with the fluid 61 (from well 70 or pump 71, 72) at, or close to, the point of entry to spray head 60. Input ports can be provided at tap points of pipe 76 or 77 and/or as part of manifold 66 that receives flow 61 from a pump 71 or 72. Spray head assemblies 73 that are used in the described examples of treatment systems typically comprise a hydrodynamic mass transfer mixing chamber that receives fluid 61 from the pump and that mixes the fluid 61 with additives such as chemical feeds 610 and 611 from manifold 66. In the absence of chemical feeds 610 and 611, the mixing chamber improves oxygenation of the fluid 61 by achieving mass transfer as it passes through the spray head 73. The chemical feeds 610 and 611 may include a feed that improves and/or augments oxygenation. In one example, the one or more chemical feeds may include generated oxygen and or ozone by a higher pressure feed.

Spray head assembly 73 may be mounted to enable rotation of at least a portion of assembly 73, such that nozzles are continuously or continually repositioned in a plane or within generally cylindrical volume. Rotation is typically powered by the force of pressure of fluid 61, by a pressurized feed 610 or 611 and/or by impact of fluids or solids on vanes provided in the interior of, or on the exterior of the head assembly 73. The mixing chamber is typically constructed to generate turbulence in the fluid, cause mixing and aeration of fluid 61 that is to be applied to the surface of water in a well and/or to the walls of the well.

In certain embodiments, a selection of materials 610, 611 can be added to and mixed with wastewater 61 through an input port or a plurality of input ports. The additives can be released intermittently according to a fixed schedule, by manual intervention of maintenance staff and/or in response to a control system configured to measure chemical and biomaterial content and/or buildup. In one example, a flow of ozone can be provided to fluid 61 received from a pump 71, 72 at a rate that is determined by one or more factors, including, rate of flow of the fluid 61, quantity of fluid 71 in well 70, measurements of odiferous, or other undesirable compounds (e.g. hydrogen sulfide) in the well 70. Hydrogen sulfide, whether in a gaseous or an aqueous state, is an example of undesirable compounds commonly associated with waste water. A variety of chemicals, organic compounds and/or bio-augmentation products may be mixed with the wastewater and the combination, quantity and/or timing of introduction of such compounds may be controlled based on well conditions and a treatment plan. Treatment plans, schedules and rules may be provided to avoid undesired interactions of the additives. Additives may used to enhance breakdown of fat, oil, grease and bio-film. Additives may comprise a detergent, an oxidizer or other chemical selected to target and breakdown a material or group of materials. Additives may also comprise an organism added to effect biological breakdown of materials. As will be appreciated, certain additives may react with or interfere with other additives; hence, different additives may be added at different times, typically to achieve different purposes.

In one example, certain embodiments of the invention pretreat contaminated water that contains various levels of sulfide ($H_2S$) in aqueous and gaseous state, sulfite, sulfates and carbonaceous biochemical oxygen demand (CBOD). Elemental sulfur may be produced and is typically, flushed from the system. Sulfite and sulfate contaminants are typically oxidized to effect change of the aqueous sulfide ion and subsequent sulfur forms. Certain embodiments of the invention enable improved mixing and mass transfer of additives with contaminated water and the increased contact, including time of contact, can improve oxidation of sulfides and sulfates in contaminated water to produce insoluble free sulfur, thereby eliminating or significantly reducing odors.

In one example, hydrogen sulfide and aqueous sulfide is easily oxidized by ozone to form sulfite. Initial oxidation is to form elemental sulfur. Further oxidation dissolves the elemental sulfur to sulfite and continued ozone oxidation ultimately forms sulfate. More ozone is required to produce sulfate from hydrogen sulfide than is required for sulfur. To achieve this, certain embodiments of the invention employ a process of direct injection of concentrated ozone and/or oxygen gas into a flowing stream of contaminated water through a mixing and dispersion system maintained in a well, container, pump station and/or tank, etc., used for treating a body of contaminated water. The mixing and dispersion systems described above can direct a flow of oxidant onto the surface of the body of contaminated water through the delivery system in order to complete the oxidation of aqueous sulfur and to accomplish marginal ancillary disinfection as the introduction of ozone and oxygen as per this method will typically increase the pH within the liquid flow, achieving a pH range of ≥6<9. The mixing head and nozzle can be provided in a compact form (see FIG. 10) that can be introduced into small or large wells, lift stations, pumping stations and grinder stations.

Certain embodiments of the invention comprise a processing system that can automatically detect levels of residual ozone in the body of water. In some embodiments, the processing system may detect presence or absence of other chemicals, treatment byproducts and chemical and biological contaminants. Processing systems, as described in more detail below, may include one or more computer processors, storage, and communication elements and may be coupled to sensors for detecting ozone, oxygen, gases such as odiferous agents, and/or other chemicals. Dosage of oxygen and/or ozone may be calculated using processors to monitor rate of consumption of ozone, presence of excess ozone and other indicators that are related to sulfide and other contaminant levels. These processors would be programmed with specific algorithms specific to the required application. For example, a particular sulfide level can be neutralized by application of a specific dose of ozone and the rate of consumption can be used to indicate the sulfide level and rate of treatment required to maintain a desired residual ozone level required for continuous or further treatment of the body of contaminated water in which the ozone is dispersed. Residual ozone can be measured by a dissolved ozone monitor with a single loop feedback to the ozone generator supply of oxygen, which may increase or decrease concentration to suit required residual need.

In certain embodiments, high concentrate ozone gas is pumped into a stainless steel (or other ozone resistant material) piped manifold system that can be instantly mixed with contaminated water and further mixed within a stainless steel (or other ozone resistant material) hydraulic hydrodynamic mixing chamber causing further oxidation. This treated contaminated water can in turn be dispersed in the head space over a set body of contained contaminated water ready for further dispersion, thereby allowing further oxidation by increased agitation causing an increase of dissolved oxygen. Existing aqueous sulfide in the wet well is oxidized as it is dispersed into the headspace of the wet well with newly formed hydroxyl ions having an air scrubbing effect within the head space.

A suitable dispersion method is described in U.S. Provisional Patent Application No. 61/167,851 (see U.S. Patent Publication US2010-0258299A1). It will be appreciated that the mixing chambers, nozzles and associated hardware may be constructed from inert materials and/or treated/coated with polymers, metals, glass, ceramics, etc. that are resist reactions and corrosion by chemicals in the contaminated water or additives.

Methods of Operation

Figure 11:
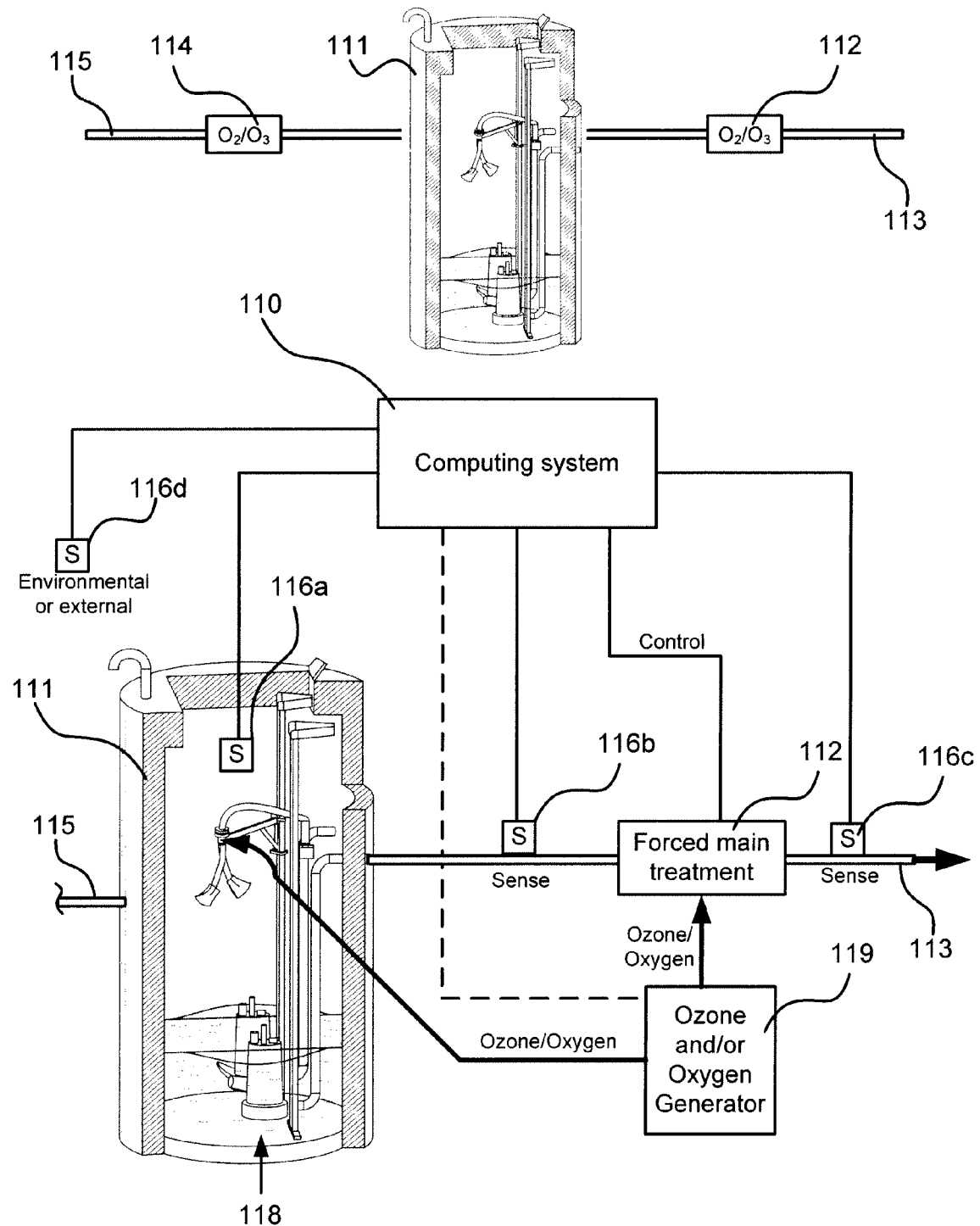
FIG. 11 shows a simplified example of a computing system employed in certain embodiments of the invention.

With reference to FIG. 11, a liquid phase ozone odor control system employing in-situ injection to a well 111, and mains 113, 115 can promote oxidization and prevent bio-aerosols, aerosols and/or misting that can release $H_2S$ into the headspace of well 111 and any other undesired gas components that can cause further release of $H_2SO_3$ or $H_2SO_4$. Systems and methods according to certain aspects of the invention can deliver chemicals such as oxidants, an organism and/or bioactive materials, alone or in proportions that can be adjusted to safely clean, decontaminate and purify wastewater. Chemical additives may be delivered to the interior of the well, including, for example, one or more of a detergent, an oxidizer (such as $O_2$ or $O_3$), bleach, calcium nitrate, ferric chloride, magnesium hydroxide, peroxide, milk of magnesia and/or other chemical selected to target and breakdown a material or group of materials. In certain embodiments, an ozone generator 119 may be operated and controlled together with a well monitoring system 116a-116d such that the addition of ozone may be optimized according to application needs and capabilities of the ozone generator 119. A computer-based controller 110 can monitor output of ozone generator 119 and can increase or decrease rate of generation of ozone as necessitated by the consumption of ozone in treating wells 111 and forced or gravity mains 113 and 115. In certain embodiments, the controller 110 may adjust flow of wastewater through mains 113 and 115 based on the sufficiency of available ozone needed to treat the flow of contaminated water. For the purposes of this discussion, mains 113 and 115 can include any combination force mains or gravity mains. In certain embodiments, waste water flows through main 115 may originate at an upstream pumping station (not shown) and, for ease of description, it will be assumed that operation of main 115 may be similar to the operation of main 113.

In one example, the levels of fluid in upstream wells can be allowed to increase as needed to allow down stream wells to accumulate sufficient ozone and/or to increase ozone generation to meet increases in demand. Furthermore, the controller may provide ozone to in-line treatment systems 112, 114 for forced mains and gravity mains 113 and 115, based on calculated rates of flow and pumping cycles. For example, when flow of contaminated fluids are increased, a pumping station 111 may not have sufficient time to remove sulfides from the contaminated water and controller 110 may cause increased quantities of ozone or other additives to be introduced to a downstream forced main treatment point 112 in order to effect oxidation of the sulfides in the main 113. Controller 110 typically calculates the rate of introduction of ozone based on measured ozone and contaminants in the main, in addition to measured contaminated water flow rates using the programmed algorithms. Similarly, in response to increases in contaminants associated with inflows from main 115, controller 110 may cause treatment station 114 to increase rate of injection of ozone or other additives to main 115.

A single ozone generator 119 may supply oxygen and ozone to a well 111 and to one or more main 113 that feed or conduct fluid to and/or away from the well 111. The controller 110 may control plural ozone generators 119. For example, if a forced main treatment point 112 or 114 is located at a sufficiently great distance upstream or downstream of a well 111 supplied by the ozone generator 119, it may impractical to feed the remote treatment point from primary generator 119 and a secondary generator (not shown) maybe deployed close to the remote treatment point 12 or 114. Control over the remote generator may be effected using wired or wireless communication network of commands from the controller 110, which may receive remote measurements using the same communication network.

Forced main treatment site 112, 114 may comprise an injection system that directly injects ozone, oxygen and/or other additives into the main 113, 115. In one example, forced main treatment point 112 or 114 comprises a mixing chamber that receives a portion of the contaminated fluid and adds and/or mixes a treatment chemical or additive before reintroducing the mixed fluid and additive/chemical to the main 113. Controller 110 may directly control operation of treatment station 112, 114 and/or may cooperate with a local controller collocated with, or embodied in treatment station 112, 114, typically control mixing of chemicals/additives based on measured content of contaminant and/or additive or other chemical in the main 113, 115. For example, the rate of addition of ozone may be increased when levels of residual ozone in the main 113 or 115 drop. In some embodiments, rate of addition of chemicals and additives may be controlled based on the rate of flow of fluid through main 113 or 115, the pressure measured in the main 113, 115 and/or the state of operation of a pump 118 in the pumping station 111. For example, downstream station 112 may be operated in a first mode when a pump 118 is actively pumping waste water into force main 113 and may operate in a second mode when the pump 118 is inactive. The modes may be distinguished by the rate of introduction of additive such as ozone, an interval in time between sequential injections of the additive, weighting of measurements from sensors 116a-116b used in a control algorithm, and son on. Activity of the pump may be determined using one or more signals, where the signal may include a signals provided by a sub-component of the controller 110, a pump 118, a valve controlling access to the main 113, a sensor 116b which can be a pressure detector, a flow detector, etc. Force and gravity mains may use different means for determining pump activity: for example, pressure changes may not sufficiently identify pump activity feeding gravity mains.

In certain embodiments, fluids are treated using a spray assembly placed within a well. The fluids may include treatment of water, including waste water, well water, sewage, storm water, contaminated water, grey water, oil well brines, and so on. The fluid may include solid matter. The spray assembly may be fixed to a well wall, a cover of the well, a top edge of the well, the floor of the well of the well or mounted on one or more pipes or other fixtures located within the well.

A process for treating the fluid comprises providing a portion of the fluid to the spray assembly. Typically, the portion of the fluid is provided using a pump used to evacuate fluid when the fluid content of the well exceeds a threshold level. The portion of fluid can be diverted through a tap on a pipe pressurized by the pump. The pump may be a grinding pump used to grind the solid matter, thereby reducing the size of solids in the fluid. The process also includes a step of introducing the fluid to a mixing chamber that introduces turbulence to the fluid. The turbulence typically aerates and/or oxygenates the fluid. Materials can be added to the fluid prior to its entry into the mixing chamber. The materials are added through one or more input ports.

In certain embodiments, the mixing chamber has a curved inner surface which receives the forces of the fluids entering the mixing chamber. The form of the curved surface is selected to minimize clogging and/or adherence of solid matter. Solid matter striking the curved surface is subjected to a force that tends to break apart the solids. The mixing chamber typically provides an output of homogenized, oxygenated fluid to one or more nozzle.

In certain embodiments, the process includes driving the homogenized, oxygenated fluid through the one or more nozzle to obtain a spray. The spray may be a ribbon spray. The process may also include selectively directing the spray to the surface of fluid remaining in the well. The process may also include selectively directing the spray to a wall of the well. The process may also include selectively directing the spray to fittings within the well, where the fittings can include piping, pumps, ladders, and so on. The spray may deliver one or more of the added materials to the fluid of the well, the wall of the well and to other elements of the well.

In some embodiments, the added materials can be released according to a fixed schedule. In some embodiments, the added materials can be released by manual intervention of a person. In some embodiments, the added materials can be released in response to a control system configured to measure chemical and biomaterial content and/or buildup. The added materials may comprise one or more of a chemical, an organic compound and bio-augmentation products. The added materials enhance breakdown of one or more materials that can include fat, oil, grease and bio-film. The added materials may comprise a detergent, an oxidizer or other chemical selected to target and breakdown a material or group of materials and may further comprise an organism added to effect biological breakdown of materials.

In certain embodiments, the process includes causing the spray to cyclically treat portions of the well. In some embodiments, cyclically treating includes causing a portion of the spray assembly to rotate. Causing a portion f the spray assembly to rotate may include providing a portion of the spray to one or more vanes that, through hydrodynamic action cause a portion of the spray assembly to rotate around a rotatable joint. In some embodiments, cyclically treating includes cycling the pump such that washing occurs at intervals of time. The intervals of time may coincide with cycles of pumping fluids from the well through a force main. The intervals may be calculated by a control system.

Control System

In certain embodiments, a computer-based control system 110 is employed to control treatment operations. As depicted in FIG. 11, a computer system 110 receives inputs from a variety of sensors 116a-116d located inside and around the well as well as in association with mains 113 upstream and downstream of the well. An example of a computer system is described in more detail below. Sensors 116a-116d may be used to monitor a plurality of operating parameters and may, for example, be used to detect pressures in forced mains, fluid levels in wells, presence of certain chemicals in the well, in feed pipes and in forced mains. Sensors 116a-116d may additionally be provided in components of the system, including in one or more pumps 118, within a body of fluid in well 111 or mains 113, in main treatment stations 112, in ozone generator 119 and/or ozone storage tanks (not shown, but typically a component of generators 119) and/or external to the system (see sensor 116d) and deployed to obtain measurements of environmental conditions and contamination. The computing system 110 may provide control signals to pumps 118, valves, ozone generators associated with the well. For example, one of pumps 118 may be operated to evacuate a portion of a body of waste water contained in a well, while another of pumps 118 may be used to drive a portion of the waste water to well cleaning system that comprises a nozzle and mixing chamber. It is contemplated that the well cleaning system may operate using a pump 118 that evacuates a portion of the well to an outflow main and that cleaning and evacuation maybe concurrent and/or may be asynchronously provided using a system of valves controlled by the controller 110. The computer system may also be used to directly control, interact with, and/or monitor systems deployed to directly control the operation of other treatment systems, including, for example, forced main treatment systems.

In one example, a forced main treatment system may receive ozone from an ozone generator and may pump the ozone into the forced main to control odors. Accordingly, sensors may be deployed to detect the presence of compounds and ions that include sulphur, hydrogen sulphide, ammonia and other gases or compounds that may give rise to odors or harmful chemical effects. As appropriate, the computing system may initiate ozone pumping in a forced main or other pipe to control the level of gas and odor. Sensors and ozone pumping devices typically form a closed loop control system that is configured to control the rate of release of ozone and total volume of release to counteract the level of sulphide or hydrogen sulphide detected. These sensors may also detect oxygen deficiency and or concentrations that infringe upon recognized lower explosive limit (LEL), upper explosive limit (UEL) and/or OSHA permissible exposure limits (PELs) required for safety regulation. Other chemicals and organic materials may be monitored to identify direct cause of undesirable effects and to help identify causal agents such as bacteria and/or other organic materials that can be treated by release of chemicals, organic compounds and/or bio-augmentation products may be mixed with the wastewater. Additives may used to enhance breakdown of fat, oil, grease and bio-film. Additives may comprise a detergent, an oxidizer (such as $O_2$ or $O_3$), bleach, calcium nitrate, ferric chloride, magnesium hydroxide, peroxide, milk of magnesia and/or other chemical selected to target and breakdown a material or group of materials.

The computing system may monitor flow of fluids in the well cleaning system and in forced mains to determine the rate of introduction of additives. The rate may be capped to prevent an excess of additive that would be wasted if released into the system. Typically, the system can control the rate of pumping of waste fluids and can calculate the amount of additive to be introduced into the well and/or forced main and therefore can accurately calculate the rate of release of materials for a known time during which pumping occurs. Typically, release of additives is suppressed when well pumps are inactive; however, it is possible to pump ozone and other additives to address buildup of undesirable chemicals and organic products. In a forced main, a portion of the fluid in the main can be diverted for mixing with the additive and pumped back into the main. In a well, the well pump or an auxiliary pump may be used to provide a carrier fluid for introducing the additive.

The computing system may communicate with sensors, pumps, additive dispensers, ozone generators/pumps using wired or wireless communication methods, such communication methods being well known to those in the data communication and computing arts. In the example of forced main treatment systems, considerable distance may exist between well and forced main treatment system and communication may often include a wireless network. In the latter example, benefit can be accrued by controlling both systems using a common controller. In one example, the forced main treatment system may have limited capacity and, the controller may selectively increase levels of additive in the well such that when the fluid is pumped into the forced main, residual levels of the additive continue to neutralize undesirable agents, chemicals and organic matter. In another example, a single ozone generator may provide ozone to both the well systems and the forced main system and a degree of balancing may be required where the ozone generator has limited capability.

System Description

Figure 12:
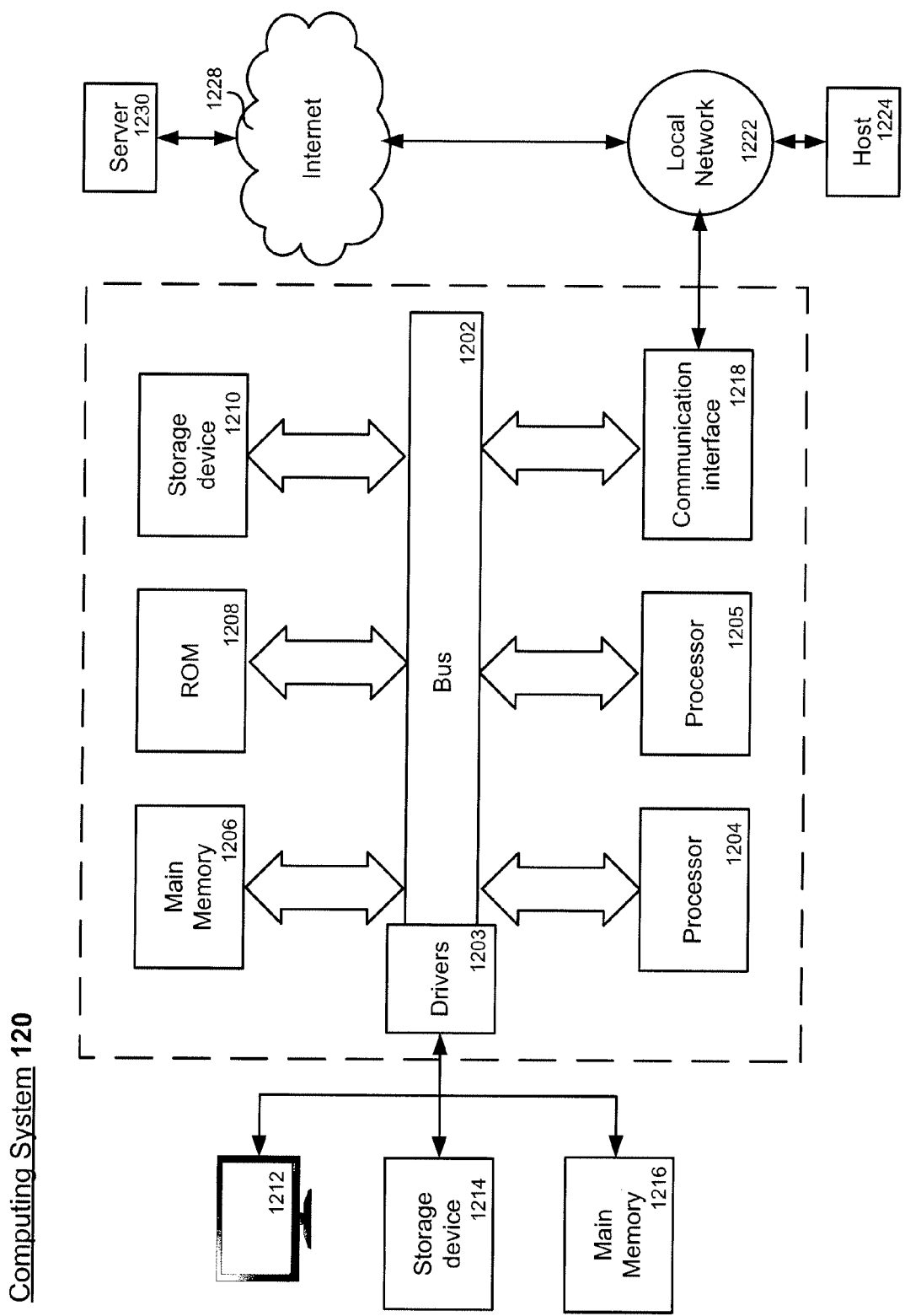
FIG. 12 shows a simplified processing system.

Turning now to FIG. 12, certain embodiments of the invention employ a processing system that includes at least one computing system 1200 deployed to perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a . . . . In one example, computing system 1200 comprises a bus 1202 and/or other mechanisms for communicating between processors, whether those processors are integral to the computing system 120 (e.g. 1204, 1205) or located in different, perhaps physically separated computing systems 1200. Device drivers 1203 may provide output signals used to control internal and external components Computing system 1200 also typically comprises memory 1206 that may include one or more of random access memory ("RAM"), static memory, cache, flash memory and any other suitable type of storage device that can be coupled to bus 1202. Memory 1206 can be used for storing instructions and data that can cause one or more of processors 1204 and 1205 to perform a desired process. Main memory 1206 may be used for storing transient and/or temporary data such as variables and intermediate information generated and/or used during execution of the instructions by processor 1204 or 1205. Computing system 1200 also typically comprises non-volatile storage such as read only memory ("ROM") 1208, flash memory, memory cards or the like; non-volatile storage may be connected to the bus 1202, but may equally be connected using a high-speed universal serial bus (USB), Firewire or other such bus that is coupled to bus 1202. Non-volatile storage can be used for storing configuration, and other information, including instructions executed by processors 1204 and/or 1205. Non-volatile storage may also include mass storage device 1210, such as a magnetic disk, optical disk, flash disk that may be directly or indirectly coupled to bus 1202 and used for storing instructions to be executed by processors 1204 and/or 1205, as well as other information.

Computing system 1200 may provide an output for a display system 1212, such as an LCD flat panel display, including touch panel displays, electroluminescent display, plasma display, cathode ray tube or other display device that can be configured and adapted to receive and display information to a user of computing system 1200. Typically, device drivers 1203 can include a display driver, graphics adapter and/or other modules that maintain a digital representation of a display and convert the digital representation to a signal for driving a display system 1212. Display system 1212 may also include logic and software to generate a display from a signal provided by system 1200. In that regard, display 1212 may be provided as a remote terminal or in a session on a different computing system 1200. An input device 1214 is generally provided locally or through a remote system and typically provides for alphanumeric input as well as cursor control 1216 input, such as a mouse, a trackball, etc. It will be appreciated that input and output can be provided to a wireless device such as a PDA, a tablet computer or other system suitable equipped to display the images and provide user input.

Processor 1204 executes one or more sequences of instructions. For example, such instructions may be stored in main memory 1206, having been received from a computer-readable medium such as storage device 1210. Execution of the sequences of instructions contained in main memory 1206 causes processor 1204 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 1204 and/or 1205, particularly where the instructions are to be executed by processor 1204 and/or 1205 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 1204 and 1205 or remotely, typically by use of network connection. Non-volatile storage may be removable from computing system 1204, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 1200. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may provide instructions and data for execution by processor 1204 and/or 1205. For example, the instructions may initially be retrieved from a magnetic disk of a remote computer and transmitted over a network or modem to computing system 1200. The instructions may optionally be stored in a different storage or a different part of storage prior to or during execution.

Computing system 1200 may include a communication interface 1218 that provides two-way data communication over a network 1220 that can include a local network 1222, a wide area network or some combination of the two. For example, an integrated services digital network (ISDN) may used in combination with a local area network (LAN). In another example, a LAN may include a wireless link. Network link 1220 typically provides data communication through one or more networks to other data devices. For example, network link 1220 may provide a connection through local network 1222 to a host computer 1224 or to a wide are network such as the Internet 1228. Local network 1222 and Internet 1228 may both use electrical, electromagnetic or optical signals that carry digital data streams.

Computing system 1200 can use one or more networks to send messages and data, including program code and other information. In the Internet example, a server 1230 might transmit a requested code for an application program through Internet 1228 and may receive in response a downloaded application that provides for the anatomical delineation described in the examples above. The received code may be executed by processor 1204 and/or 1205.

Figure 13:
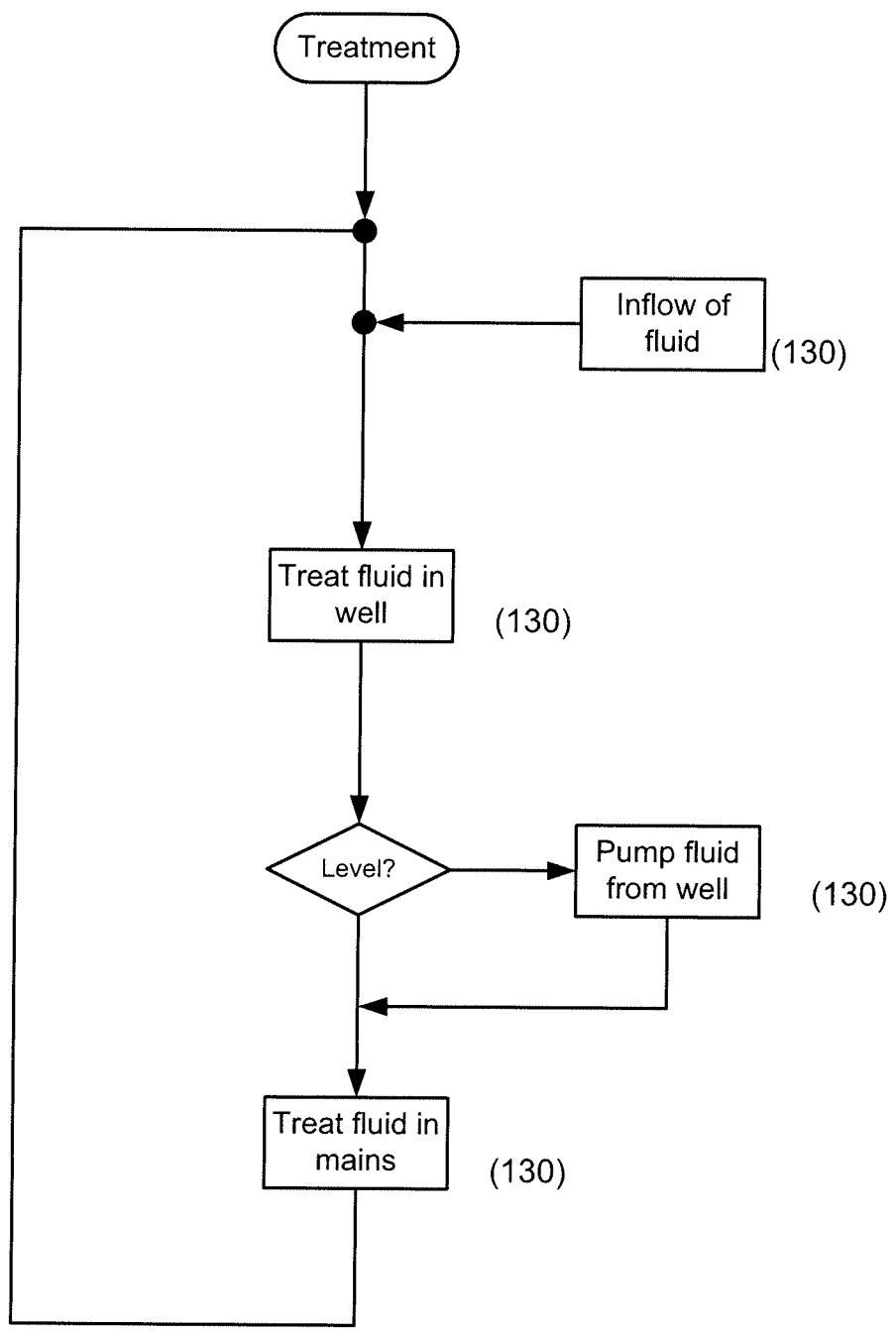
FIG. 13 is a flow chart illustrating a simplified process according to certain aspects of the invention.

FIG. 13 is a flow chart illustrating a process for controlling operation of the simplified example shown in FIG. 11. At step 130, an inflow of contaminated fluid to pump station 111 is detected. Sensors in station 111 are monitored to determine levels of contaminants and levels of fluid in the station 111. As necessary, the body of fluid may be treated at step 132 with a flow of fluid obtained from the station 111 that has been mixed with additives that comprise ozone received from ozone generator 119. If the level of fluid in the station 111 is detected at step 134 to exceed a threshold level, then a portion of the fluid may be pumped through forced main 113 at step 136. It is contemplated that, in some embodiments, the portion of fluid may be provided to a gravity feed main. At step 138, ozone may be selectively provided to main 113 based on measurements of conditions in the main 113. Ozone is typically added to main 113 using treatment station 112.

In certain embodiments, computing system 110 can monitor upstream, downstream and in-station conditions and can adjust flow of additives according to detected conditions. Additives may include ozone from ozone generator 119 and/or oxygen and other chemicals. The computing system 110 may comprise an industrial controller collocated with the station 111, a forced main treatment location 112 and/or an ozone generator 119. The computing system 110 may be at least partially embodied in a remote device such as a network server. In operation, computing system monitors the presence of one or more contaminants and may control one or more of the quantity and the rate of introduction of oxidant or additive accordingly. For example, the interval between treatments may be increased or decreased based on rate of inflow and/or rate of increase of contaminants measured in the station 111. The quantity of oxidant may be increased or decreased according to conditions in the well. For example, a sudden inflow of waste water may result in a step increase of contaminants that may be best treated with short-term increase in the amount of additive provided to the station 111.

In certain embodiments, computing system 110 may pretreat inflows by causing a treatment station (not shown) on an inflow force main 115 to inject oxidants into the force main 115. Pre-treatment may be performed periodically and/or in response to changes in measured contaminant levels measured in the inflow force main 115 or in inflows received at a pumping station 111. In certain embodiments, computing system 110 may cause a treatment station 112 on an outflow force main 113 to inject oxidants into the force main 113. Treatment of the outflow main 113 may be performed according to a schedule and/or may be performed based on measured levels of contaminants and/or additives in the force main 113. Treatment of force main 113 may also be initiated by computing system 110 based on contaminant levels measured in the pumping station 111 as the waste water is pumped into force main 113. Computing system 110 can typically be configured to adjust treatment plans, schedules and levels based on whether an inflow or outflow main is a force main or gravity main and/or based on whether a main treatment system 112 is available on the inflow or outflow main.

In certain embodiments, a control algorithm is executed by the computing system 110 to control treatment of the waste water system. Control algorithm is typically configured to manage a closed-loop system that includes additive injection elements and instruments that measure controlled chemicals and/or additives in the system. The wastewater treatment system may comprise multiple pump and/or grinder stations 111 interconnected by force and/or gravity mains, whereby the outflow main of one station serves as the inflow main of another station. Control algorithm can typically be configured to model pumping/grinding station characteristics, including capacity and rates of flows of wastewater. Control algorithm can typically be configured to model force and gravity mains in the system and may model throughputs, lengths of mains. Control algorithm may be adaptive such that variations from expected performance or capacity of an element can be incorporated into a model of the element. Certain embodiments automatically adjust to environmental conditions, including ambient temperature and humidity, and these systems may adjust treatment schedules and schemes based on prior histories of measurements under similar conditions.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide water treatment systems and methods. Certain of these embodiments comprise a collection station having a well for collecting a body of waste water received from an inflow main. Certain of these embodiments comprise a dispersion system that receives a portion of collected waste water from the well. In certain embodiments, the dispersion system comprises a hydrodynamic mixing chamber and a nozzle. In certain embodiments, an additive is mixed with a portion of collected water passing through the mixing chamber. In certain embodiments, the mixed collected waste water and additive is dispersed through the nozzle as a spray to one or more of the surface of the body of waste water and a wall of the well. Certain of these embodiments comprise a controller having one or more processors configured to monitor the level of waste water in the well. In certain embodiments, the controller is configured to cause a pump to drive a portion of the waste water from the well through an outflow main when the level of waste water in the well exceeds a threshold level. In certain embodiments, the controller is configured to control a rate of flow of the additive to the mixing chamber.

In certain embodiments, the dispersion system comprises a manifold that provides the portion of collected water and the additive to the mixing chamber. In certain embodiments, the additive comprises liquid ozone. In certain embodiments, the controller controls rate of flow of the liquid ozone based on measurements provided by sensors deployed in the well. In certain embodiments, the measurements include a measurement of residual ozone level in the collected waste water. In certain embodiments, the measurements include a measurement of sulfide in the collected waste water. In certain embodiments, the measurements include a measurement of hydrogen sulfide in the well. In certain embodiments, the controller is configured to control a main treatment system, wherein the main treatment system mixes ozone with waste water in one or more of the inflow and outflow mains. In certain embodiments, the controller controls rate and frequency of treatment of the wastewater in the one or more mains based on a measurement of sulfide ions in the one or more mains.

In certain embodiments, the controller is configurable to control rate and frequency of treatment of the wastewater in the one or more mains based on a measurement of residual ozone in the one or more mains. In certain embodiments, the controller is configurable to control rate and frequency of treatment of the wastewater in the one or more mains based on a measurement of wastewater flow in the one or more mains. In certain embodiments, the one or more mains include a force main.

Certain embodiments of the invention provide water treatment systems and methods. Certain of these embodiments comprise the step of measuring a concentration of one or more contaminants in a collection station. In certain embodiments, the collection station maintains a body of waste water received from an inflow main. Certain of these embodiments comprise the step of providing a portion of the waste water to a dispersion system comprising a hydrodynamic mixing chamber and a nozzle. Certain of these embodiments comprise the step of controlling the flow of an additive to the mixing chamber. In certain embodiments, the additive operates to neutralize the one or more contaminants. Certain of these embodiments comprise the step of dispersing a mixture of the waste water and the additive through the nozzle onto one or more of the surface of the body of waste water and a wall of the well. Certain of these embodiments comprise the step of evacuating a portion of the body of waste water through an outflow main. In certain embodiments, the flow of the additive is controlled based on a measurement of a level of the one or more contaminants in the well. In certain embodiments, the additive includes ozone. In certain embodiments, the additive comprises ozone. Certain of these embodiments comprise the step of measuring a concentration of at least one contaminant in the outflow main. Certain of these embodiments comprise the step of causing a downstream treatment station to mix ozone with the evacuated portion of waste water when the measured concentration of the at least one contaminant exceeds a predetermined threshold concentration. In certain embodiments, the additive comprises ozone. In certain embodiments, the outflow main is a force main. Certain of these embodiments comprise the step of detecting a flow of waste water in the force main. Certain of these embodiments comprise the step of causing a downstream treatment station to introduce ozone to the force main when waste water is flowing in the force main.

Certain embodiments of the invention provide systems and methods for controlling and managing waste water collection and treatment. Certain embodiments comprise a first sensor provided in a well of a collection station. In some embodiments, the first sensor monitors a contaminant level in the well. Certain embodiments comprise a second sensor provided in an outflow main. In some embodiments, the second sensor monitors a contaminant level in the outflow main. Certain embodiments comprise a pump provided in the collection station. In some embodiments, the pump operates to evacuate waste water from the well when the volume of waste water in the well exceeds a predetermined threshold volume. Certain embodiments comprise an ozone generator configured to generate ozone. In some embodiments, the ozone is maintained in a reservoir of ozone. Certain embodiments comprise a dispersion assembly deployed within the collection station. In some embodiments, the dispersion system is adapted to mix a portion of the waste water from the well with ozone provided by the ozone generator. In some embodiments, the dispersion assembly is configured to spray one or more of a wall of the well and a surface of the volume of waste water in the well with a mixture of the ozone and the waste water. Certain embodiments comprise an outflow main treatment system operable to mix a portion of the waste water from the outflow main with ozone provided by the ozone generator and configured to reintroduce the mixed ozone and waste water from the outflow main into the outflow main. In certain embodiments, a processor controls the rate at which ozone is provided to the dispersion assembly and to the force main treatment system based on measurements of contaminants received from the first and second sensors. In some embodiments, the processor is configurable to maintain the level of contaminants in the well and the outflow main below a desired threshold level.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A water treatment system comprising:
    a well adapted to collect a body of waste water received from an inflow main;
    a spray head assembly, wherein the spray head assembly has a hydrodynamic mixing chamber provided therein, and a nozzle;
    a multi-port manifold adapted to be attached to the spray head assembly and to attach the spray head assembly to an end of a conduit that carries waste water from the well, wherein the multi-port manifold is configured to conduct waste water from the conduit to the hydrodynamic mixing chamber in the spray head assembly, and further configured to couple a supply of additive to the hydrodynamic mixing chamber in the spray head assembly,
    wherein the hydrodynamic mixing chamber is configured to mix the additive with the waste water, and further configured to cause a mixture of waste water and the additive to leave the hydrodynamic mixing chamber through the nozzle, and
    wherein the nozzle is configured to disperse the mixture as a spray on to a surface of the body of waste water or a wall of the well; and
    a controller comprising a non-transitory memory device having one or more sequences of instructions stored thereon that, when executed by one or more processors of the controller, cause the controller to:
        obtain measurements of a contaminant or residual additive in the well;
        calculate an amount of the additive to be introduced to the well based on the measurements of the contaminant or the residual additive; and
        control a rate of flow of the additive to the mixing chamber based on the amount of the additive calculated for introduction to the well.

2. The water treatment system of claim 1, wherein the hydrodynamic mixing chamber has a structure configured to cause agitation within the hydrodynamic mixing chamber while the additive is mixed with waste water.

3. The water treatment system of claim 2, wherein the additive comprises ozone, and wherein the hydrodynamic mixing chamber is constructed from an ozone resistant material, and wherein the agitation causes the ozone to be instantly mixed with waste water received from the multi-port manifold.

4. The water treatment system of claim 2, wherein the one or more sequences of instructions cause the controller to:
obtain measurements of chemical or biomaterial content in the well from sensors deployed in the well; and
control a rate of flow of the additive through the multi-port manifold based on the measurements of chemical or biomaterial content in the well.

5. The water treatment system of claim 2, wherein the additive comprises ozone, and wherein the one or more sequences of instructions cause the controller to:
obtain a measurement of residual ozone in the well; and
control a rate of flow of the ozone through the multi-port manifold based on the measurement of the residual ozone in waste water collected in the well.

6. The water treatment system of claim 4, wherein the measurements include a measurement of sulfide in waste water collected in the well.

7. The water treatment system of claim 4, wherein the measurements include a measurement of hydrogen sulfide in the well.

8. The water treatment system of claim 1, wherein the one or more sequences of instructions cause the controller to:
determine a concentration of a contaminant or residual additive in a main that provides an inflow of waste water to the well or receives an outflow of waste water from the well;
calculate an amount of additive to be introduced into the main based on the concentration of the contaminant or the residual additive; and
control a rate of flow of the additive introduced to the main by a main treatment system, wherein the main treatment system is configured to:
mix a portion of fluid extracted from the main with ozone; and
reintroduce the portion of fluid mixed with ozone into the main.

9. The water treatment system of claim 8, wherein the controller is configured to control rate and frequency of treatment of the waste water in the one or more mains based on a measurement of residual ozone or sulfide ions in the one or more mains.

10. The water treatment system of claim 8, wherein the controller is configured to control rate and frequency of treatment of the waste water in the one or more mains by exchanging commands and measurements over a data communications network with a controlling device collocated with the main treatment system.

11. The water treatment system of claim 8, wherein the controller is configured to control rate and frequency of treatment of the waste water in each main of the one or more mains based on a measurement of waste water flow in the each main.

12. The water treatment system of claim 8, wherein the controller includes a communication interface configured to communicate with a sensor, a pump, an additive dispenser, or an ozone generator using a two-way data communication network.

13. The water treatment system of claim 8, wherein the controller is configured to control rate and frequency of treatment of the waste water in the main based on a level of contaminants measured in the well.

14. A water treatment method performed by a controller and comprising the steps of:
receiving measurements of a concentration of one or more contaminants in a collection station from at least one sensor, the collection station maintaining a body of waste water received from an inflow main;
providing a portion of the waste water to a spray head assembly comprising a hydrodynamic mixing chamber and a nozzle;
calculating a rate of introduction of an additive to the collection station in accordance with a predefined algorithm, wherein the rate of introduction of the additive is calculated based on the measurements of the concentration of the one or more contaminants and a measured rate of flow of the waste water received from the inflow main;
controlling the flow of the additive to the mixing chamber in accordance with the calculated rate of introduction of the additive, wherein the hydrodynamic mixing chamber is configured to mix the additive with waste water as the waste water is transmitted through the spray head assemble, and wherein the additive operates to neutralize the one or more contaminants, wherein a mixture of the waste water and the additive is passed through the nozzle onto a surface of the body of waste water or a wall of the collection station; and
evacuating a portion of the body of waste water through an outflow main when a volume of waste water in a well of the collection station exceeds a predetermined threshold volume,
wherein the spray head assembly is attached to a multi-port manifold that is attached to an end of a conduit and that conducts waste water from the conduit to the hydrodynamic mixing chamber in the spray head assembly, and
wherein the hydrodynamic mixing chamber has a structure configured to cause agitation within the hydrodynamic mixing chamber while the additive is mixed with waste water.

15. The method of claim 14, wherein the rate of introduction of the additive is calculated based on a measurement of a level of the one or more contaminants or residual additive in the collection station.

16. The method of claim 15, wherein the additive includes ozone, and wherein the hydrodynamic mixing chamber is constructed from stainless steel or an ozone resistant material.

17. The method of claim 14, further comprising the steps of:
receiving measurements of a concentration of at least one contaminant in the outflow main; and
causing a downstream treatment station to mix the additive with the evacuated portion of waste water when the measurements of concentration of the at least one contaminant exceeds a predetermined threshold concentration using a data communications network to exchange commands and measurements with a controlling device collocated with the downstream treatment station.

18. The method of claim 14, wherein the additive comprises ozone, and wherein the outflow main is a force main, and further comprising the steps of:
detecting a flow of waste water in the force main; and
causing a downstream treatment station to introduce ozone to the force main when waste water is flowing in the force main using a data communications network to exchange commands and measurements with a controlling device collocated with the downstream treatment station.

19. The method of claim 14, wherein the additive comprises one or more of ozone and oxygen, and further comprising the steps of:
measuring a concentration of at least one contaminant in the collection station; and
causing an upstream treatment station to pre-treat waste water in the inflow main with the additive based on the measurements of concentration of the at least one contaminant in the collection station using a data communications network to exchange commands and measurements with a controlling device collocated with the upstream treatment station.

20. A control system for managing waste water treatment, comprising:
- a first sensor provided in a well of a collection station, the first sensor monitoring a contaminant level in the well;
- a second sensor provided in an outflow main, the second sensor monitoring a contaminant level in the outflow main;
- a pump provided in the collection station, wherein the pump operates to evacuate waste water from the well when volume of waste water in the well exceeds a predetermined threshold volume;
- a spray head assembly having a hydrodynamic mixing chamber, a plurality of ports and a nozzle, the spray head assembly being deployed within the collection station and adapted to mix a portion of the waste water from the well with ozone received from an ozone generator, and configured to spray a wall of the well or a surface of the volume of waste water in the well with a mixture of the ozone and the waste water;
- an outflow main treatment system operable to mix a portion of the waste water from the outflow main with ozone received from the ozone generator and configured to reintroduce the mixed ozone and waste water from the outflow main into the outflow main; and
- a processor that responds to stored instructions that cause the processor to calculate a rate at which ozone is provided to the spray head assembly and to the outflow main treatment system in accordance with a predefined algorithm and based on measurements of residual ozone or contaminants received from the first and second sensors, wherein the processor is configurable to maintain levels of contaminants in the well and the outflow main below a desired threshold level,
- wherein the spray head assembly is attached to a multi-port manifold that is attached to an end of a conduit and that conducts waste water from the conduit to the hydrodynamic mixing chamber in the spray head assembly, and
- wherein the hydrodynamic mixing chamber has a structure configured to cause agitation within the hydrodynamic mixing chamber while an additive is mixed with waste water.

* * * * *